(12) United States Patent
Berrocal-Plaza et al.

(10) Patent No.: US 12,096,305 B2
(45) Date of Patent: Sep. 17, 2024

(54) METHOD AND SYSTEM FOR HANDLING ROAMING IN TRAIN-TO-TRACKSIDE WIRELESS NETWORKS

(71) Applicant: AOIFE SOLUTIONS, S.L., Camas (ES)

(72) Inventors: Victor Berrocal-Plaza, Camas (ES); Jose Ayub Gonzalez Garrido, Camas (ES); Jose Antonio Delgado Alfonso, Camas (ES)

(73) Assignee: AOIFE SOLUTIONS, S.L., Camas (ES)

(*) Notice: Subject to any disclaimer, the term of this patent is extended or adjusted under 35 U.S.C. 154(b) by 337 days.

(21) Appl. No.: 17/761,344

(22) PCT Filed: Oct. 21, 2019

(86) PCT No.: PCT/EP2019/078496
§ 371 (c)(1),
(2) Date: Mar. 17, 2022

(87) PCT Pub. No.: WO2020/187430
PCT Pub. Date: Sep. 24, 2020

(65) Prior Publication Data
US 2022/0353778 A1    Nov. 3, 2022

(30) Foreign Application Priority Data
Sep. 17, 2019   (ES) .................... ES201930805

(51) Int. Cl.
*H04W 36/32*   (2009.01)
*H04W 36/00*   (2009.01)
*H04W 36/30*   (2009.01)

(52) U.S. Cl.
CPC ....... *H04W 36/32* (2013.01); *H04W 36/0058* (2018.08); *H04W 36/0061* (2013.01); *H04W 36/30* (2013.01)

(58) Field of Classification Search
CPC ......... H04W 36/0058; H04W 36/0061; H04W 36/0083; H04W 36/00835;
(Continued)

(56) References Cited

U.S. PATENT DOCUMENTS

2011/0267969 A1   11/2011   Ceccherini et al.
2018/0084471 A1   3/2018    Emmanuel et al.

FOREIGN PATENT DOCUMENTS

| EP | 1601136 A1 | 11/2005 | |
| WO | 2006122233 A2 | 11/2006 | |
| WO | WO-2014029870 A2 * | 2/2014 | ........ H04W 36/0083 |

OTHER PUBLICATIONS

Xi Chen, HaND: Fast Handoff with Null Dwell Time for IEEE 802.11 Networks, IEEE Infocom 2010 (Year: 2010).*
(Continued)

*Primary Examiner* — Harun Chowdhury
(74) *Attorney, Agent, or Firm* — LUCAS & MERCANTI, LLP

(57) ABSTRACT

A method and system for handling roaming in train-to-trackside wireless networks including: receiving, by an access point ($AP_i$) currently associated with a train access terminal installed on-board a train, radio measurements of signals received by the train access terminal from access points of the train-to-trackside wireless network; determining a next access point ($AP_{next}$) providing the highest signal quality (maxSQ); evaluating compliance with roaming criteria including: the next access point ($AP_{next}$) is included in a list of candidate access points ($N_i$); the time elapsed since the last roaming exceeds a minimum permanency time ($t_p$); the highest signal quality (maxSQ) exceeds the signal qual- (Continued)

ity (SQ(i)) of the access point ($AP_i$) by a roaming margin; if the roaming criteria are met, sending a roaming command instructing the train access terminal to roam to the next access point ($AP_{next}$).

15 Claims, 22 Drawing Sheets

(58) Field of Classification Search
CPC . H04W 36/0085; H04W 36/30; H04W 36/32; H04W 36/324; H04W 84/005
USPC ................................. 370/329, 331, 332, 401
See application file for complete search history.

(56) References Cited

OTHER PUBLICATIONS

Oppo: Discussion on conditional handover optimization; 3GPP Draft; TSG-RAN WG2#101; Athens, Greece, Feb. 26-Mar. 2, 2018; 3 pages.

International Search Report and Written Opinion for Corresponding International Application No. PCT/EP2019/078496 dated Oct. 21, 2019; 13 Pages.

* cited by examiner

| Mode | Guard | Best rate | MCS index | Rate index | Airtime | max(tp) | avg(tp) | avg(P) | std(P) | Retry | Last Suc. | Last Attemp | sum of #Suc. | sum of #Att. |
|---|---|---|---|---|---|---|---|---|---|---|---|---|---|---|
| HT20 | LGI |  | MCS0 | 0 | 1477 | 4.8 | 4.8 | 100.0 | 0.0 | 1 | 0 | 0 | 2 | 2 |
| HT20 | LGI |  | MCS1 | 1 | 738 | 9.7 | 9.7 | 95.4 | 14.0 | 4 | 0 | 0 | 31 | 37 |
| HT20 | LGI | D | MCS2 | 2 | 492 | 14.6 | 12.2 | 73.3 | 43.4 | 5 | 0 | 0 | 4631 | 5654 |
| HT20 | LGI |  | MCS3 | 3 | 369 | 17.0 | 12.2 | 63.5 | 38.0 | 4 | 0 | 0 | 28407 | 32611 |
| HT20 | LGI | B | MCS4 | 4 | 246 | 24.4 | 14.6 | 53.3 | 36.6 | 5 | 0 | 0 | 6887 | 9336 |
| HT20 | LGI |  | MCS5 | 5 | 185 | 29.2 | 0.0 | 0.0 | 0.0 | 0 | 0 | 0 | 21 | 963 |
| HT20 | LGI |  | MCS6 | 6 | 164 | 31.7 | 0.0 | 0.0 | 0.0 | 0 | 0 | 0 | 1 | 963 |
| HT20 | LGI |  | MCS7 | 7 | 148 | 34.1 | 0.0 | 0.0 | 0.0 | 0 | 0 | 0 | 0 | 962 |
| HT20 | SGI |  | MCS0 | 30 | 1329 | 4.8 | 4.8 | 100.0 | 0.0 | 0 | 0 | 0 | 1 | 1 |
| HT20 | SGI |  | MCS1 | 31 | 665 | 9.7 | 9.7 | 95.5 | 19.6 | 4 | 0 | 0 | 54 | 62 |
| HT20 | SGI | C | MCS2 | 32 | 443 | 14.6 | 12.2 | 75.0 | 27.4 | 5 | 0 | 0 | 5227 | 6516 |
| HT20 | SGI | A, P | MCS3 | 33 | 332 | 19.5 | 19.5 | 94.1 | 15.4 | 5 | 2 | 2 | 113164 | 124447 |
| HT20 | SGI |  | MCS4 | 34 | 222 | 26.8 | 7.3 | 28.7 | 41.3 | 5 | 0 | 0 | 14867 | 18109 |
| HT20 | SGI |  | MCS5 | 35 | 166 | 31.7 | 0.0 | 0.2 | 4.6 | 0 | 0 | 0 | 17 | 963 |
| HT20 | SGI |  | MCS6 | 36 | 148 | 34.1 | 0.0 | 0.0 | 0.0 | 0 | 0 | 0 | 1 | 963 |
| HT20 | SGI |  | MCS7 | 37 | 133 | 36.6 | 0.0 | 0.0 | 0.0 | 0 | 0 | 0 | 0 | 962 |

Fig. 21

METHOD AND SYSTEM FOR HANDLING ROAMING IN TRAIN-TO-TRACKSIDE WIRELESS NETWORKS

CROSS-REFERENCE TO RELATED APPLICATIONS

This application is a 371 of PCT/ES2019/078496, filed Oct. 21, 2019, which claims the benefit of Spanish Patent Application No. P201930805, filed Sep. 17, 2019, each of which are incorporated herein by reference.

FIELD OF THE INVENTION

The present disclosure relates to wireless communication systems, and more particularly to roaming in IEEE 802.11 networks for train-to-trackside applications.

BACKGROUND OF THE INVENTION

Nowadays, people expect to get on the Internet independent of location. However, providing high-speed Internet connections on board of a train is a very challenging issue due to the inherent features of such special scenario. For example, railcars have Faraday cage-like characteristics, which may lead to high penetration losses when the transmitting and the receiving sources are not within the same railcar, or to a high multipath fading when the transmitting and the receiving sources are within the same railcar. There may also be high voltages and magnetic fields in the surrounding, as in electrical or magnetic levitation trains. Moreover, there may be frequent handoffs or roaming procedures in the cellular network due to the train's mobility, which may lead to constant service disruptions and a poor user experience; tunnels may limit visibility to wireless communication devices; and railway companies constantly add or remove railcars from trains, so it is necessary to have network mechanisms to automatically discover when a railcar has been added or removed from the train.

The above mentioned problems have been addressed with different technologies, e.g. LTE, WiMax, IEEE 802.11, and satellite communications. For the specific case of IEEE 802.11 networks, passengers connect to one of the Wi-Fi access points (APs) that are deployed within their railcar. Access points within railcars are in turn connected to a train access terminal (TAT) that is installed outside one of the train's railcars. Train access terminals are in charge of serving as a wireless bridge between the access points deployed within the railcars and the access points deployed along the railway track. Both the train access terminals and the access points deployed along the railway track may have directional antennas to cover all the area of interest with a high enough signal quality in both the downlink and the uplink. Finally, these last access points are connected to the aggregation network, which is in charge of communicating these access points with the Internet gateway.

The communication established between the train access terminals and the access points deployed along the railway track can be referred to as train-to-trackside communication, and the networks thereby set up as train-to-trackside wireless networks. In order to maintain Internet data sessions of passengers on a train, train access terminals must be frequently re-associated to a new access point as the train moves along the railway track. In IEEE 802.11 networks, the process by means of which a wireless device is re-associated from its current access point to a new one is commonly referred to as roaming process.

This roaming process is currently driven by the train access terminal, which periodically compares the strength of the signal received from its current access point to a pre-defined threshold to determine if a roaming is required. Once the signal strength drops below that threshold, the train access terminal scans all the available channels with the aim of finding a new access point that provides a better signal quality and, if so, the train access terminal completes a roaming process by authenticating and associating itself to that new access point. In order to facilitate and speed-up the roaming process, the IEEE 802.11 standard provides a mechanism for fast Basic Service Set (BSS) transition between access points, which is described in the IEEE 802.11r amendment.

Roaming processes driven by the train access terminal are not well suited for train-to-trackside applications for the following reasons. Firstly because the train access terminal may frequently roam from one access point to another and, in each roaming process, it may decide to be associated to any access point within its range based on instant values of signal strength, without taking into account the effect due to multipath fading. As a consequence, instead of choosing the next access point in its path, the train access terminal may choose to be associated with an access point with which it has been recently associated. This last would increase the number of roaming processes per time instant and, hence, the possibility of disrupting passenger data sessions. Furthermore, due to the fact that the knowledge is maintained in the train access terminal, every train access terminal must learn its new path whenever its railcar is added to a train of another railway track.

Other important aspect to take into account when designing an efficient train-to-trackside application is the behavior of the rate control algorithm just after a roaming process has taken place. In IEEE 802.11 networks, each wireless device implements a rate control algorithm. This algorithm is in charge of selecting the modulation and coding scheme (MCS) at which data frames are transmitted. When a wireless device initiates a new communication with another wireless device, the rate control algorithm of each device commonly selects an initial MCS to start transmitting data. That MCS may be a randomly selected MCS, or an MCS pre-configured beforehand. Afterwards, the rate control algorithm of each wireless device changes the MCS according to the quality of the radio link between both devices. Therefore, after each roaming process, the rate control algorithm of each wireless device (i.e. train access terminal and access point) starts transmitting with an initial MCS, which may be higher or lower than the optimum MCS, and hence, train passengers might perceive a degradation in their quality of service.

The invention described herein proposes mechanisms to solve the above mentioned problems generated in the roaming processes in train-to-trackside wireless networks. Furthermore, the teachings explained herein may be used to tackle roaming in other specific use-cases, such as vehicular mobility in roads and highways.

DESCRIPTION OF THE INVENTION

The present invention relates to a system and method of handling roaming in train-to-trackside wireless networks. The invention is specifically designed for improving the communication between the train access terminals and the access points deployed along the railway track, i.e. the train-to-trackside part of the above described system.

The invention allows taking optimized decisions on the best new access point to associate with the train access terminal and the appropriate instant to initiate a roaming process in train-to-trackside networks, to avoid unwanted effects, such as multipath fading or ping-pong effect. The invention also provides mechanisms to guarantee that the roaming process to the selected new access point (i.e. the best candidate) is effectively performed.

Besides, since the decision-making is implemented in the network infrastructure (i.e. the access points deployed along the railway track and/or a central control station), roaming processes may be constrained to be performed only towards the next access point in the path and, furthermore, the same decision may be taken no matter the train access terminal that is traveling along the railway track (unlike the prior art, where the decision is taken in the train access terminal, so that every train access terminal must learn its new path whenever its railcar is added to a train of another railway track). The invention also proposes mechanisms to maintain the knowledge of the rate control algorithm from one access point to another, avoiding in this way the throughput degradation of current methods.

The method of handling roaming comprises the following steps:

Receiving, by an access point currently associated with a train access terminal installed on-board a train, radio measurements of signals received by the train access terminal from access points of the train-to-trackside wireless network.

Determine a next access point, said next access point being the access point providing the highest signal quality according to a quality metric.

Evaluate compliance with a set of roaming criteria, the roaming criteria including (i) the next access point is included in a list of candidate access points, (ii) the amount of time elapsed since the last roaming performed by the train access terminal exceeds a minimum permanency time, and (iii) the highest signal quality exceeds the signal quality of the access point currently associated with the train access terminal by at least a roaming margin.

Sending, if the roaming criteria are met, a roaming command instructing the train access terminal to roam from the access point currently associated with the train access terminal to the next access point.

The method may also comprise the step of determining the list of candidate access points used in the evaluation of the roaming criteria, wherein the list of candidate access points is determined based on the direction of travel and the route followed by the train. The method may further comprise acquiring the direction of travel and the route followed by the train by accessing a train database of a data center that may be part of any of the systems of the railway operator.

The access point currently associated with the train access terminal sends radio measurements orders to the train access terminal. The train access terminal, upon receiving a radio measurement order or periodically after receiving the first radio measurement order from that access point, measures the signals received from access points in its range. Afterwards, the train access terminal sends these measures to that access point in a radio measurement response. In an embodiment, all the access points deployed along the railway track may share a common SSID, and the method comprises sending, by the access point currently associated with the train access terminal, a radio measurement request addressed to the train access terminal and including a command to perform active scanning of the common SSID.

The active scanning request may include an instruction to perform the scanning periodically. Alternatively, the train access terminal may be configured to repeatedly send (e.g. periodically) radio measurements to the access point currently associated with. In that case, the method may comprise repeatedly sending, by the train access terminal, radio measurements of signals received from access points in range.

The quality metric may include computing, for each access point, the least squares regression of the instant values of the received signals strength.

The roaming margin may be a dynamic margin $M(t)$ that decreases over time for $t > t_r$, where $t_r$ is the instant of time when the last roaming procedure of the train access terminal occurred.

In an embodiment, the method further comprises:

Obtaining, by the next access point when the roaming criteria are met, information related to the quality of the radio link between the train access terminal and the access point currently associated with the train access terminal.

Determining, based on said information, a modulation and coding scheme to transmit data frames from the next access point to the train access terminal.

Setting, in the radio driver of the next access point, the selected modulation and coding scheme for the downlink communication with the train access terminal.

The information used to determine the modulation and coding scheme may be obtained by querying the access point currently associated with the train access terminal. Alternatively, the method may comprise storing, on a global database by each access point of the train-to-trackside wireless network, information related to the quality of the radio link between the access point and the associated train access terminals; and wherein the information used to determine the modulation and coding scheme is retrieved by the next access point by accessing the global database when the roaming criteria are met.

The method may comprise receiving, by an access point of the network, a roaming request from a train access terminal, checking if said access point corresponds to the determined next access point, and in that case accepting the roaming request by the next access point; otherwise, ignoring the roaming request.

Another aspect of the present invention refers to a system for handling roaming in train-to-trackside wireless networks. The system comprises a plurality of access points deployed along a railway track, and is configured to perform the steps of the method. In a centralized configuration, the system comprises a central control station configured to evaluate compliance with the roaming criteria. Alternatively, in a distributed configuration, the access point currently associated with the train access terminal is configured to evaluate compliance with the roaming criteria.

When instructing a train access terminal to perform a roaming process, the invention described herein may make use of the fast roaming mechanism described in the IEEE 802.11r amendment, or of any other prior-art mechanism used to re-authenticate and re-associate a wireless device from one access point to another.

BRIEF DESCRIPTION OF THE DRAWINGS

A series of drawings which aid in better understanding the invention and which are expressly related with an embodiment of said invention, presented as a non-limiting example thereof, are very briefly described below.

FIG. 21 illustrates an exemplary table containing information related to the quality of the radio link between the train access terminal and the access point. This information may be used by the rate control algorithm of the present invention.

DESCRIPTION OF A PREFERRED EMBODIMENT OF THE INVENTION

Figure 1:
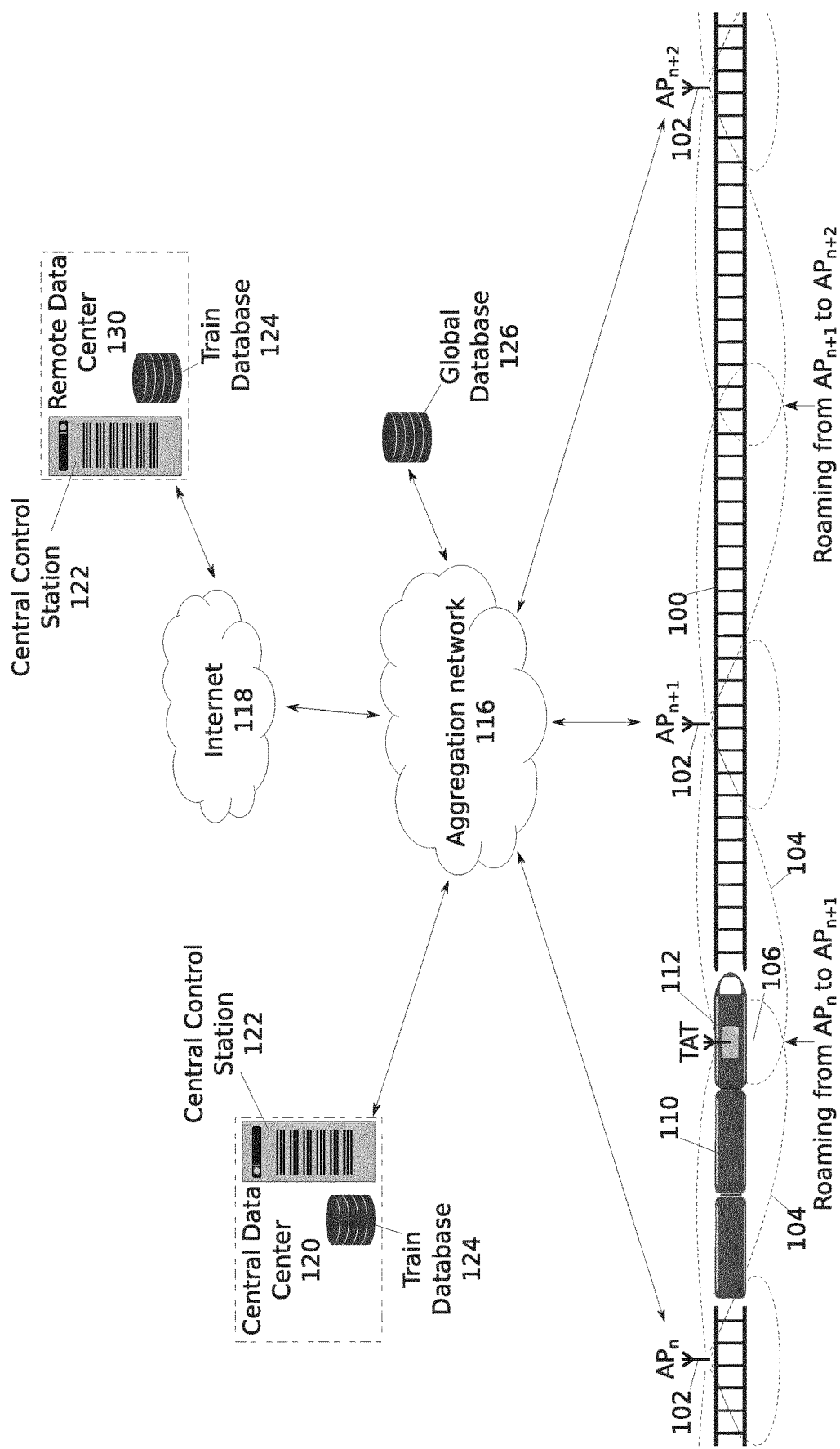
FIG. 1 depicts an example of a train-to-trackside infrastructure and the coverage along the railway track, and also showing different elements that may be part of a system with either a centralized or a distributed configuration.

The present invention refers to a system and method of handling roaming in IEEE 802.11 train-to-trackside wireless networks. As depicted in FIG. 1, this type of networks includes a plurality of access points 102 ($AP_n$, $AP_{n+1}$, $AP_{n+2}$) deployed along a railway track 100 and one or more train access terminals 112 installed on-board (normally outside the front and back railcar) at least one train 110 moving along the railway track 100. Both the train access terminals 112 and the access points 102 deployed along the railway track 100 may have directional antennas with a radiation pattern 104 that covers all the area of interest with a high enough signal quality in both the downlink and the uplink. In the following, for the sake of simplicity and without loss of generality, we assume that there is only one train access terminal 112 installed outside one of the train's railcars.

A process to roam from an access point ($AP_n$) to a subsequent access point ($AP_{n+1}$) is normally initiated when the train access terminal 112 reaches the intersection 106 of adjacent radiation patterns 104.

All the access points 102 are connected through an aggregation network 116. Access points may be connected to the aggregation network 116 through wired or wireless links. The aggregation network 116 may also include a mesh communication network among access points. A central data center 120, in charge of storing and processing information related to the invention described herein, may be directly connected to the aggregation network 116. Alternatively, a remote data center 130 may be remotely connected to the aggregation network 116 through the Internet 118. Both the central data center and the remote data center may be part of any of the systems of the railway operator. The system of the present invention may work using a distributed configuration or a centralized configuration.

In a centralized configuration, a central control station 122 is in charge of managing and coordinating the roaming of the train access terminal 112 from an access point 102 to another access point 102. The central control station 122 may be located in the central data center 120, in the remote data center 130, or in a different site (although there are two different central control stations 122 depicted in FIG. 1, normally only one central control station 122 would be required).

The central data center may comprise a train database 124 for storing information on trains 110 and train access terminals 112, such as unique identifiers of the trains and/or train access terminals, route followed by each train, graph G of access points of the network associated to the route followed by each train, direction of travel d of each train and its train access terminals, etc. This information may be used by the method of handling roaming. Again, although there are two different train databases 124 depicted, normally only one would be needed.

In a distributed configuration, the system may make use of a global database 126 for storing and sharing data among the access points 112 of the network. The global database 126 may be installed in the central/remote data center (120, 130) or in a different installation, as depicted in the example.

Figure 2A:
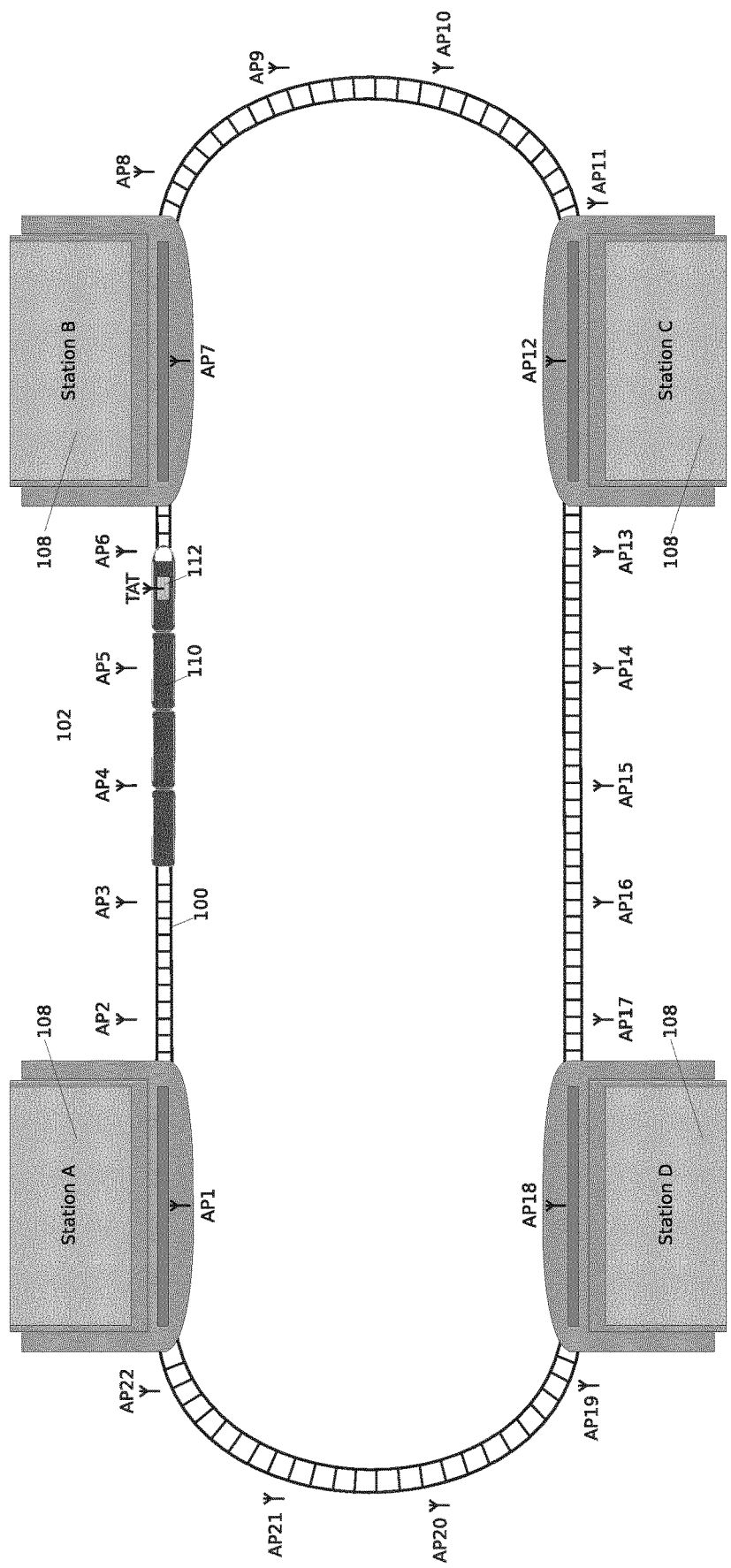
FIGS. 2A and 2B represent two possible layouts of a train-to-trackside infrastructure: circular use case (FIG. 2A), and round trip use case (FIG. 2B).

The present invention improves the communication between the train access terminals 112 and the access points 102 deployed along the railway track 100, i.e. the train-to-trackside network. Examples of two possible use cases are shown in FIG. 2A for a circular path across several train stations 108 (stations A, B, C and D) and FIG. 2B for a round trip path between two train stations (station A and D). In both examples, the train access terminal 112 must frequently re-associate with other access points as it moves along the railway track 100 in order to maintain the Internet data session of the train passengers (see FIG. 1).

Figure 2B:
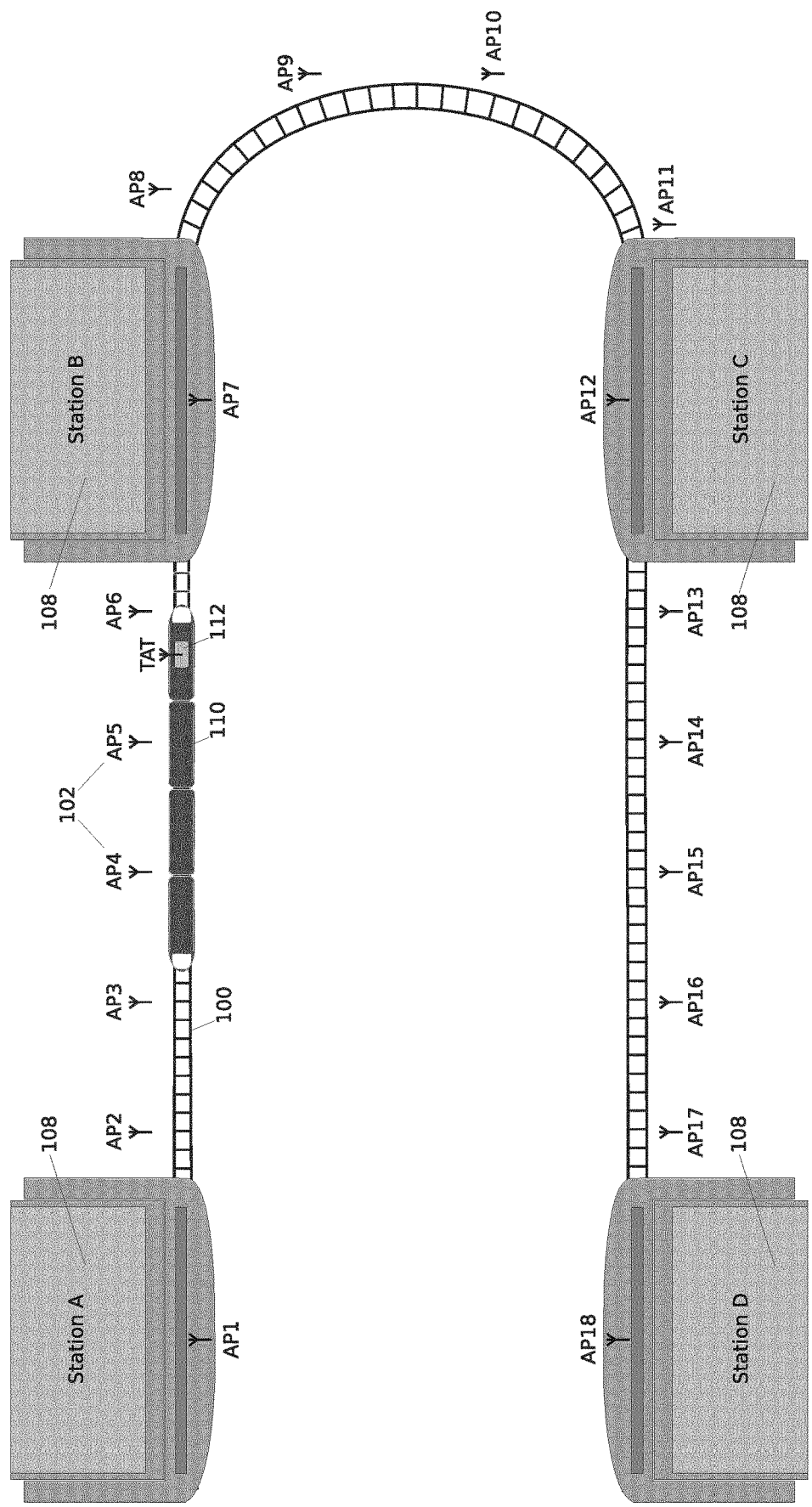
Figure 3A:
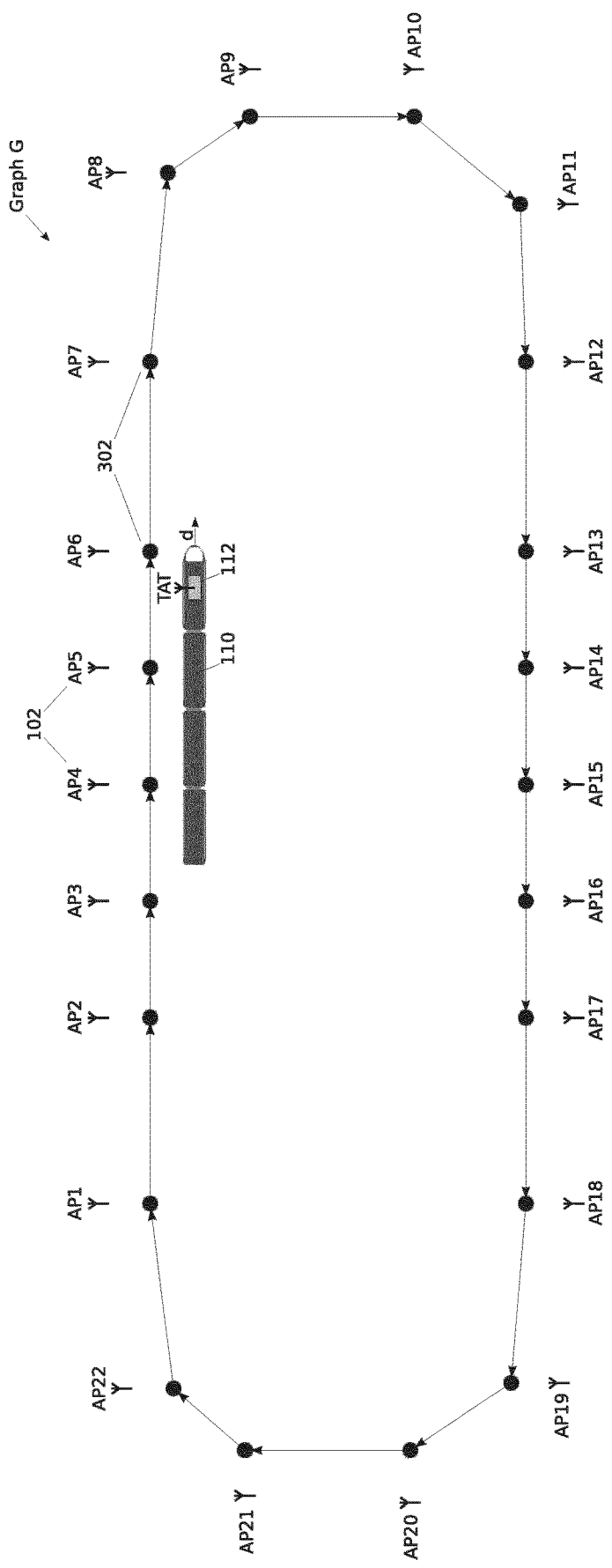
FIGS. 3A and 3B respectively show an exemplary graph G of the circular use case of FIG. 2A and the round trip use case of FIG. 2B.
Figure 3B:
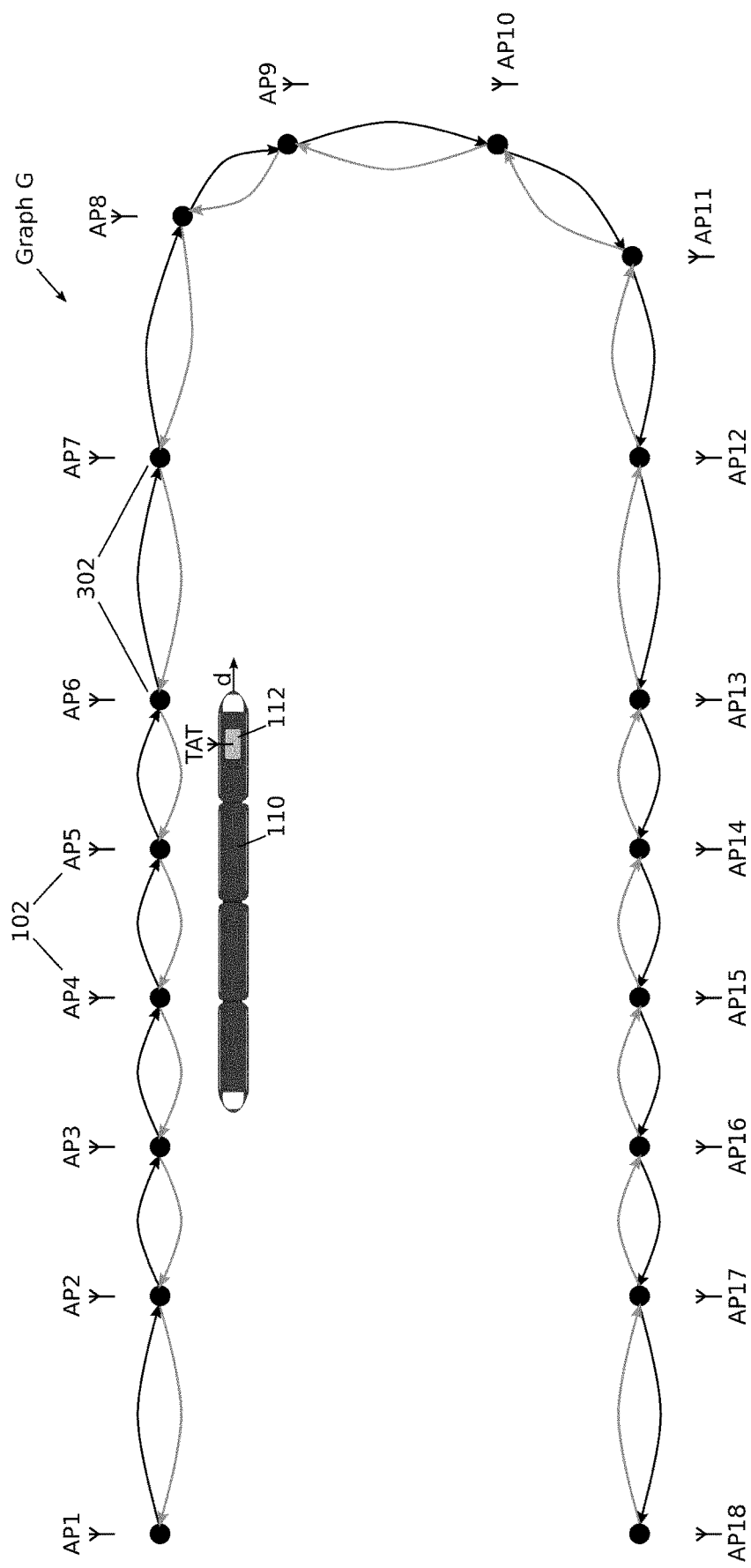

The frequency at which a train access terminal 112 roams from the current access point to a next access point depends on the train velocity, cells size, and distance among access points. Once the network infrastructure (i.e. the access points 102 along the railway track 100) knows the path followed by every train 110 in that railway track, a graph G associated with the route followed by each train is obtained (the nodes 302 of the graph G correspond to the access points 102 along the train route). The graph G associated with each of the two use cases of FIG. 2 is depicted in FIG. 3. FIG. 3A shows the graph G for the circular case of FIG. 2A, and FIG. 3B shows the graph G for the round trip of FIG. 2B. Once known the graph G, the access point currently associated to the train access terminal 112, and the direction of travel d of the train (i.e., [current AP, G, d]), the next access point in graph G, to which the train access terminal 112 should be re-associated, can be determined. The graph G can be obtained by using any known method in graph theory.

Figure 4:
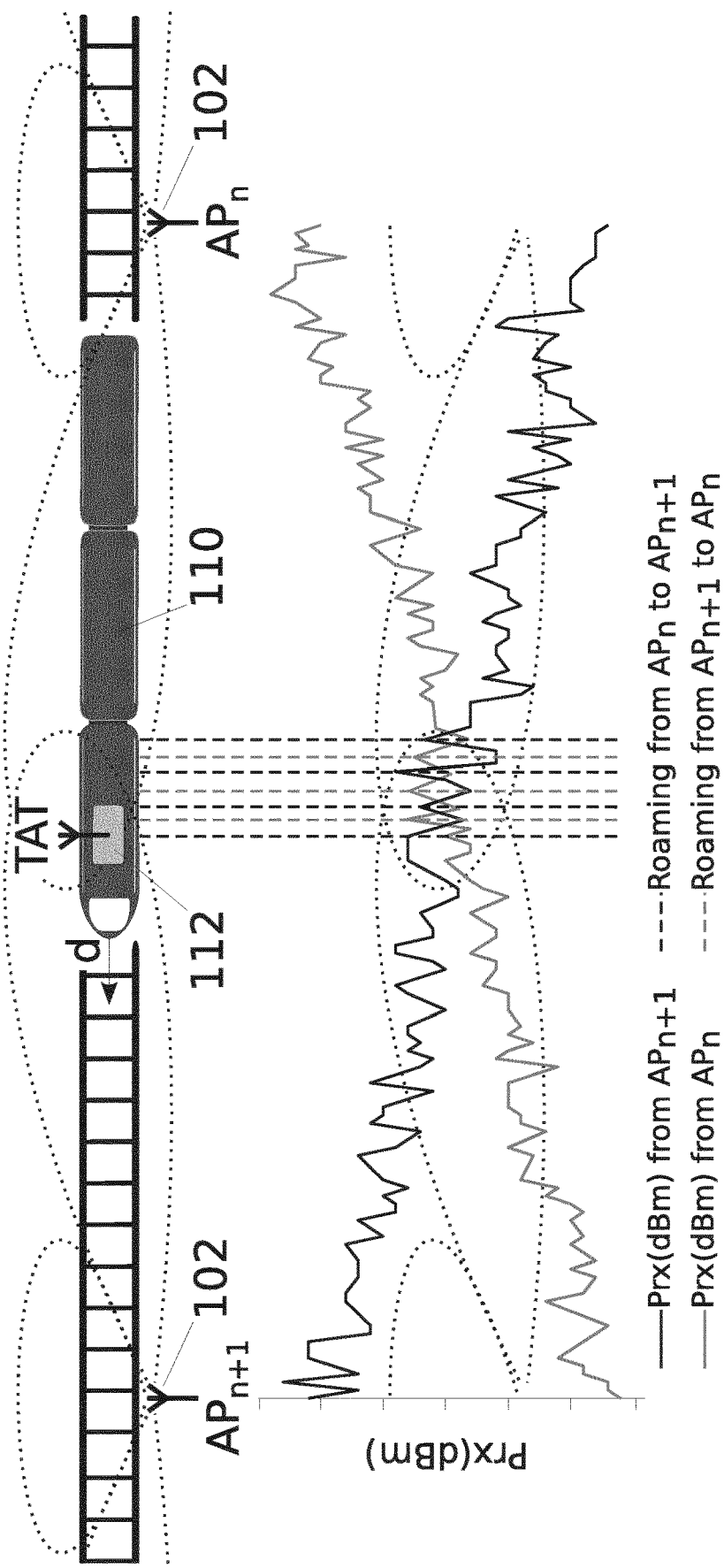
FIG. 4 shows an example of ping-pong effect due to multi-path fading.

Signals transmitted to/by a train access terminal 112 are affected by several radio-electrical physical effects which may make signals received by a wireless device fluctuate to a greater or lesser extent. A direct consequence of such fluctuation of received signals is that prior-art proposals may make bad roaming decisions, especially in the border of two radio cells. An example is depicted in FIG. 4, where due to fluctuations in the received signals, the train access terminal 112 performs several roaming processes between the current access point ($AP_n$) and the next access point ($AP_{n+1}$). This effect is commonly known as ping-pong effect and may lead to critical throughput degradations and even to service disruptions.

Figure 12:
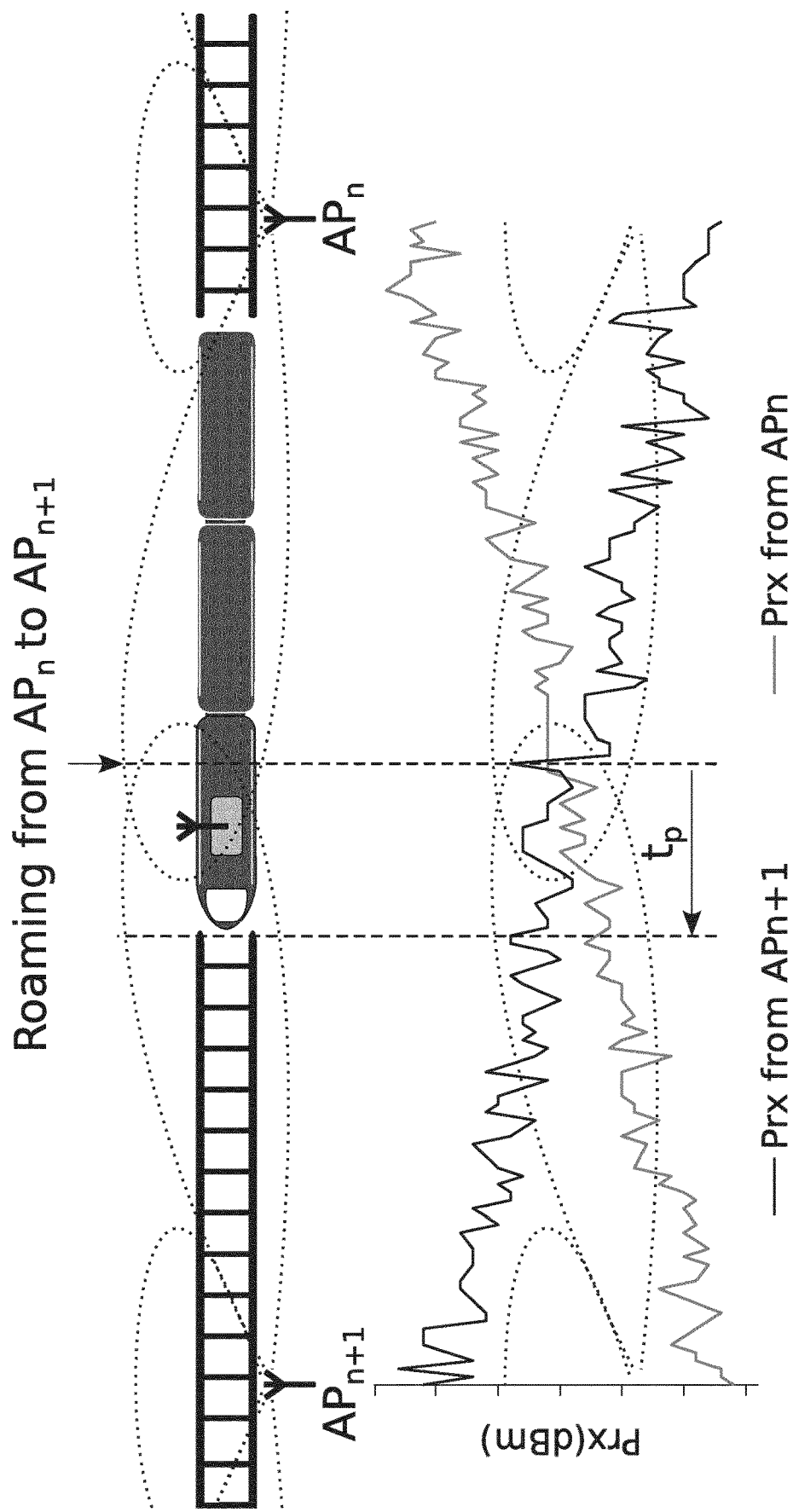
FIG. 12 depicts an example of a minimum permanency time ($t_p$) in a cell just after performing a roaming process.

The present invention proposes different mechanisms to deal with the ping-pong effect. Firstly, all roaming requests directed to a non-candidate access point are ignored, avoiding this way all backward roaming processes (e.g. roaming processes from $AP_{n+1}$ to $AP_n$ in the example of FIG. 4), as well as all roaming processes directed to adjacent access points. Secondly, the present invention uses a minimum permanency time ($t_p$) and a margin (M(t)). The minimum permanency time ($t_p$) is used to ignore all the roaming requests sent by the train access terminal 112 during a determined period of time $t_p$ after the last roaming procedure (see FIG. 12). The margin (M(t)) is preferably a dynamic margin, and is used when comparing the quality of the signals received from the current access point with the quality of the signals received from all the candidate access points. M(t) may vary in time according to a positive function that decreases over time, e.g. M(t) may be an exponential function such as $M(t)=e^{(1/(t-tr))}-1$, where $t>t_r$, and $t_r$ is the time instant when the last roaming procedure occurred.

Figure 5:
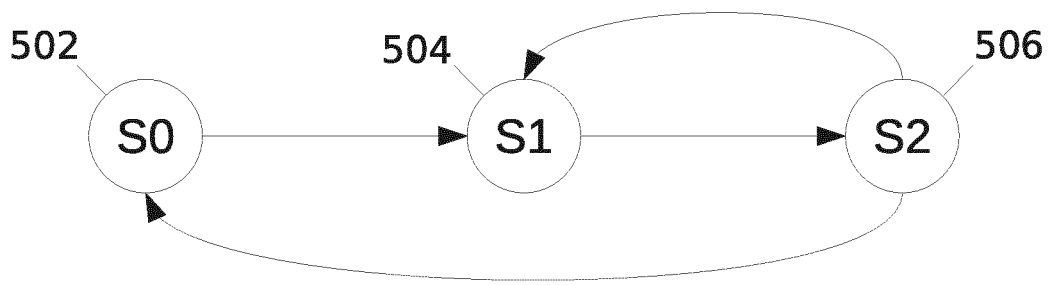
FIG. 5 depicts a state diagram of the method of the present invention to control roaming procedures in a train-to-trackside application.

The state diagram of the invention proposed herein is shown in FIG. 5. The state diagram comprises the states S0 (502), S1 (504) and S2 (506). All the parameters used in the state diagram of the invention may be adjusted depending on the train velocity.

The state diagram is executed for each train access terminal 112 traveling along the railway track. The state diagram may be executed in a distributed or a centralized way.

In a distributed configuration, the steps needed to implement the state diagram are distributed among the access points 102. Each step of the state diagram may be performed by one or more access points 102. The set of access points 102 in charge of carrying out a given step of the state diagram may vary as the train access terminal 112 moves along the railway track 100. In this configuration, information is exchanged between the access points, which may be connected through a wireless or a wired communication link.

In a centralized structure, a central network infrastructure (e.g. a central control station 122) performs the steps S0-S2 of the state diagram. The central control station 122 is in communication (wired or wirelessly) with all the access points 102 of the network, gathering information and sending instructions. The inputs for the state diagram are the access point currently associated to the train access terminal ($AP_i$), the graph G of the route followed by the train 110, and the direction of travel d of the train (i.e. [$AP_i$, G, d]).

In the following examples, it is assumed that all the access points 102 deployed along the railway track 100 are configured with the same SSID (e.g. $SSID_{T2T}$). In state S0, represented in FIG. 6, the first step is to obtain 602 the set of candidate access points $N_i$ for the train access terminal 112. The set of candidate access points $N_i$ is calculated by using the graph G (which can be derived from the route followed by the train) and taking into account the direction of travel d of the train. The list of candidate access points $N_i$ may comprise one or more access points. Afterwards, the access point ($AP_i$) currently associated with the train access terminal periodically monitors 604 the quality of the signals (signal quality, SQ) received by the train access terminal 112. The access point ($AP_i$) currently associated with the train access terminal 112 may periodically send radio measurement requests to the train access terminal 112 to inquire the train access terminal 112 to perform active scanning of $SSID_{T2T}$. Upon receiving a radio measurement request, the train access terminal 112 actively scans the corresponding frequency band and, afterwards, reports the result of such active scanning to $AP_i$, which would store that results in a database. The scan results stored in a database may be processed in order to determine the quality of the signals received by the train access terminal 112 from each of the access points in its range.

Figure 11:
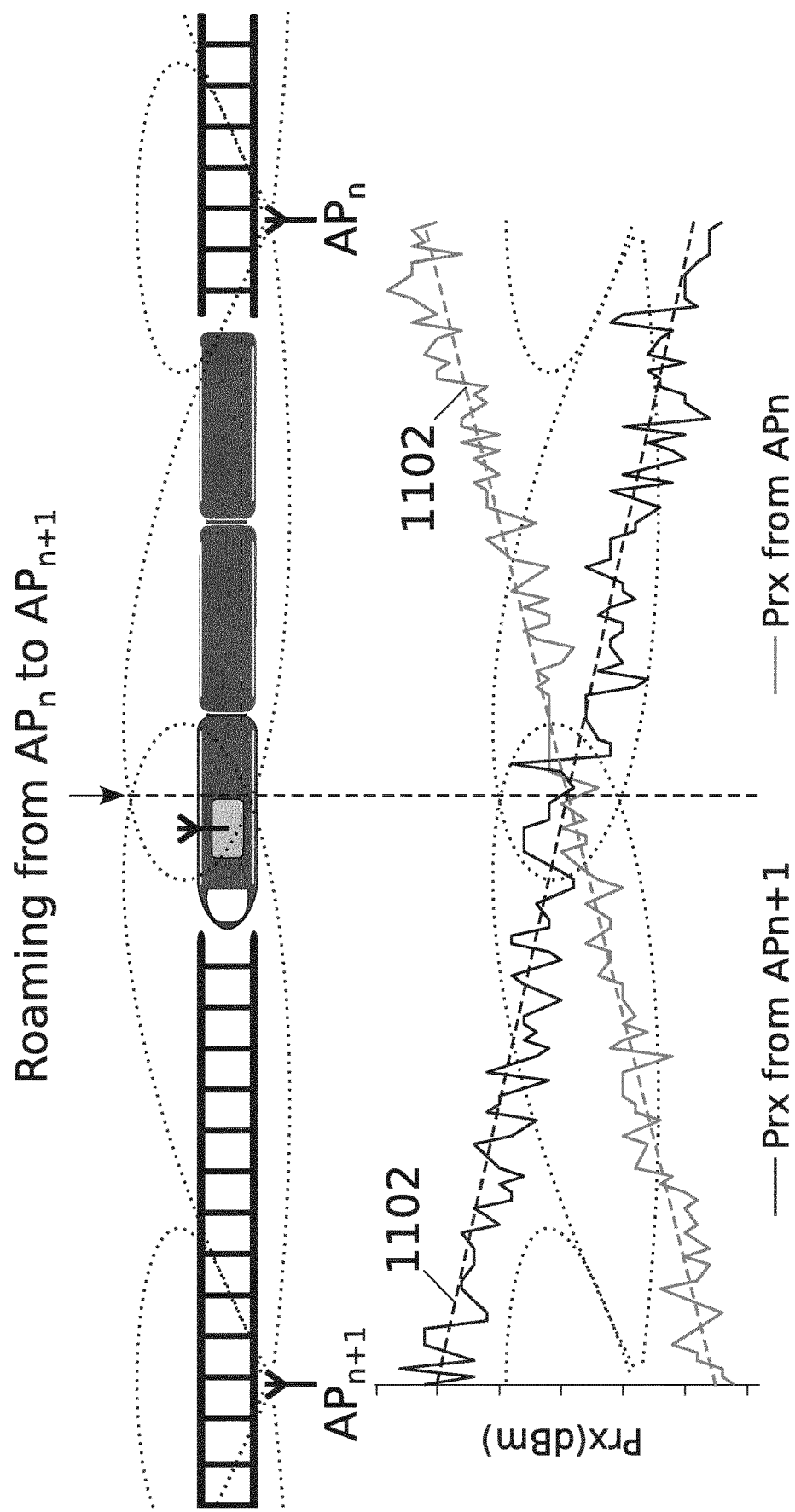
FIG. 11 represents an example of monitoring the quality of RF signals between a train access terminal and nearby access points, and the roaming performed based on the least squares regression of the instant values of the received signals.

The data processing may provide a metric (SQ) per access point in range, associating a real value to the signal quality perceived by the train access terminal 112. Some prior-art proposals use as a metric the received signal strength obtained in the last scan result. However, comparing signals quality based on instant values of the received signals strength may be a poor practice in train-to-trackside applications because the strength of the received signals may fluctuate due to multipath fading, causing the ping-pong effect of FIG. 4 (i.e., several consecutive roaming processes from $AP_n$ and $AP_{n+1}$ and vice versa). A more advanced quality metric may be used, for instance by computing the least squares regression 1102 of the instant values of the received signals strength (see FIG. 11). By doing so, the signal randomness is reduced, and even it may be predicted when the roaming process should take place by determining the cross point between the two least squares lines associated with the current access point ($AP_n$ in FIG. 11) and the next access point ($AP_{n+1}$ in FIG. 11). The IEEE 802.11 standard provides mechanisms to inquire a train access terminal 112 to perform some predefined commands, which are described in the IEEE 802.11k amendment. The invention described herein may make use of the IEEE 802.11k amendment, or of any other mechanism used to command the train access terminal to perform an active scanning and report the result of such active scanning.

Figure 6:
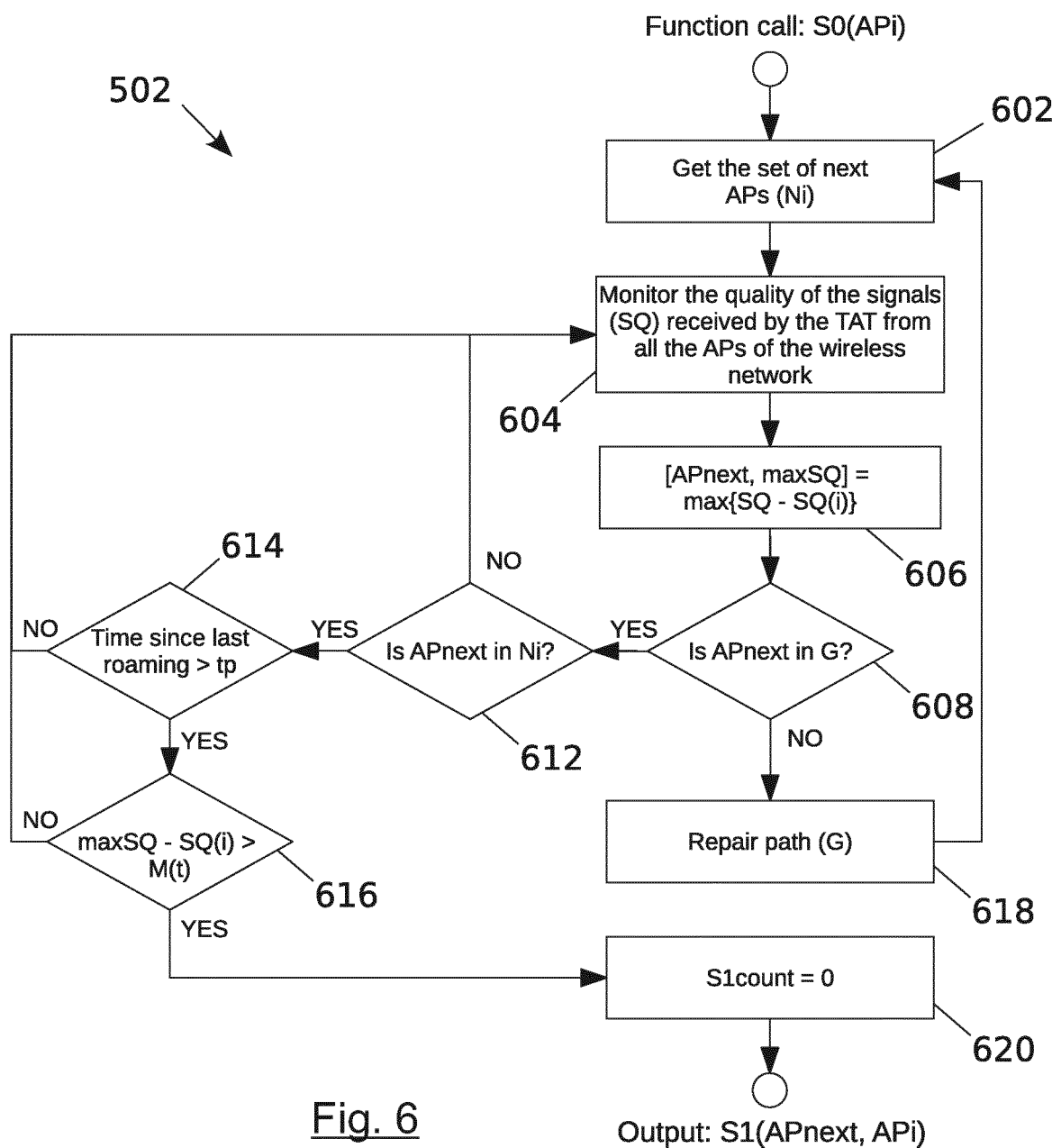
FIGS. 6, 7 and 8 respectively represent the states S0, S1 and S2 of the state diagram shown in FIG. 5.

Once a quality metric (SQ) is obtained for each access point in range, the access point that provides the best quality metric (maxSQ) is determined 606 and selected as the next access point ($AP_{next}$). The computation in step 606 is performed on the set of signal qualities [SQ-SQ(i)], excluding the quality metric SQ(i) of the access point ($AP_i$) currently associated with the train access terminal, so that the selected next access point ($AP_{next}$) cannot be $AP_i$. Alternatively, the best quality metric (maxSQ) can be obtained considering all the access points, even $AP_i$, but if the best quality metric (SQmax) corresponds to SQ(i) the roaming is not performed. Thereafter, the following conditions or roaming criteria are checked (steps 612, 614 and 616 of FIG. 6):

(i) The next access point ($AP_{next}$) is not the access point $AP_i$ currently associated with the train access terminal (this roaming criterium may be checked after the signal quality measurements, if the signal quality is measured for all the access points; or may be implicitly performed when measuring signal qualities by disregarding the signal quality of $AP_i$, as depicted in FIG. 6; or $AP_i$ may be not included in the list of candidate APs, see next criterium);

(ii) the next access point ($AP_{next}$) is in the list of candidate APs ($N_i$);

(iii) more than $t_p$ seconds have passed since the last roaming; and (iv) the difference between the signals quality received by the train access terminal from $AP_i$ (SQ(i)) and from the next access point $AP_{next}$ (maxSQ) is greater than the value of the margin (M(t)) at that time.

If the next access point ($AP_{next}$) is not a node of the graph G, checked in step 608, a graph repairing operation 618 may be carried out to include the new node in the graph G. The graph repairing operation 618 may be performed by the network administrator. Every change in the graph G must be updated in the corresponding network nodes and databases, e.g. in the central/remote data center for the centralized configuration or in the global database and the access points within the path (G) of that train access terminal for the distributed configuration. Any of the prior-art methods to repair the graph G may be used. When all the roaming criteria are met, a counter $S1_{count}$ is initialized to 0 in step 620 and the system transitions to state S1; otherwise, the system remains periodically monitoring 604 the quality of the signals received by the train access terminal 112 until the roaming criteria are met.

Figure 7:
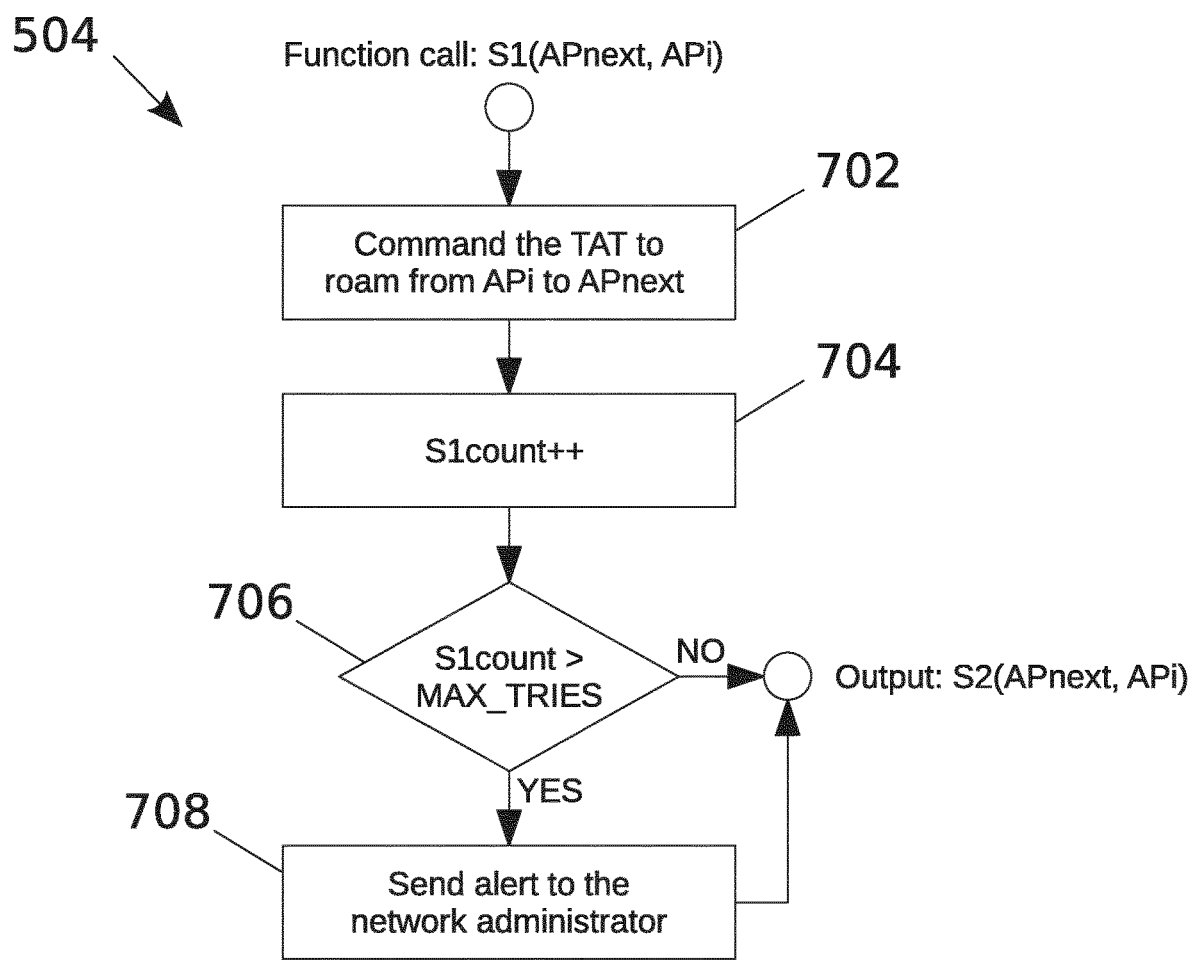

State S1 is depicted in FIG. 7. In this state, the access point ($AP_i$) currently associated with the train access terminal 112 commands 702 the train access terminal 112 to perform a roaming (e.g., a fast roaming) from $AP_i$ to $AP_{next}$. The IEEE 802.11 standard provides mechanisms to inquire a train access terminal to roam from one access point to another. This operation is defined in the IEEE 802.11v amendment. The present invention may make use of the IEEE 802.11v amendment, or of any other mechanism used to command a train access terminal to roam from one AP to another. The counter $S1_{count}$ is used to count 704 how many times the system has tried to roam the train access terminal 112 from $AP_i$ to $AP_{next}$. An alert is sent 708 to the network administrator if $S1_{count}$ has surpassed 706 a maximum value (MAX_TRIES). Finally, the system transitions to state S2.

Figure 8:
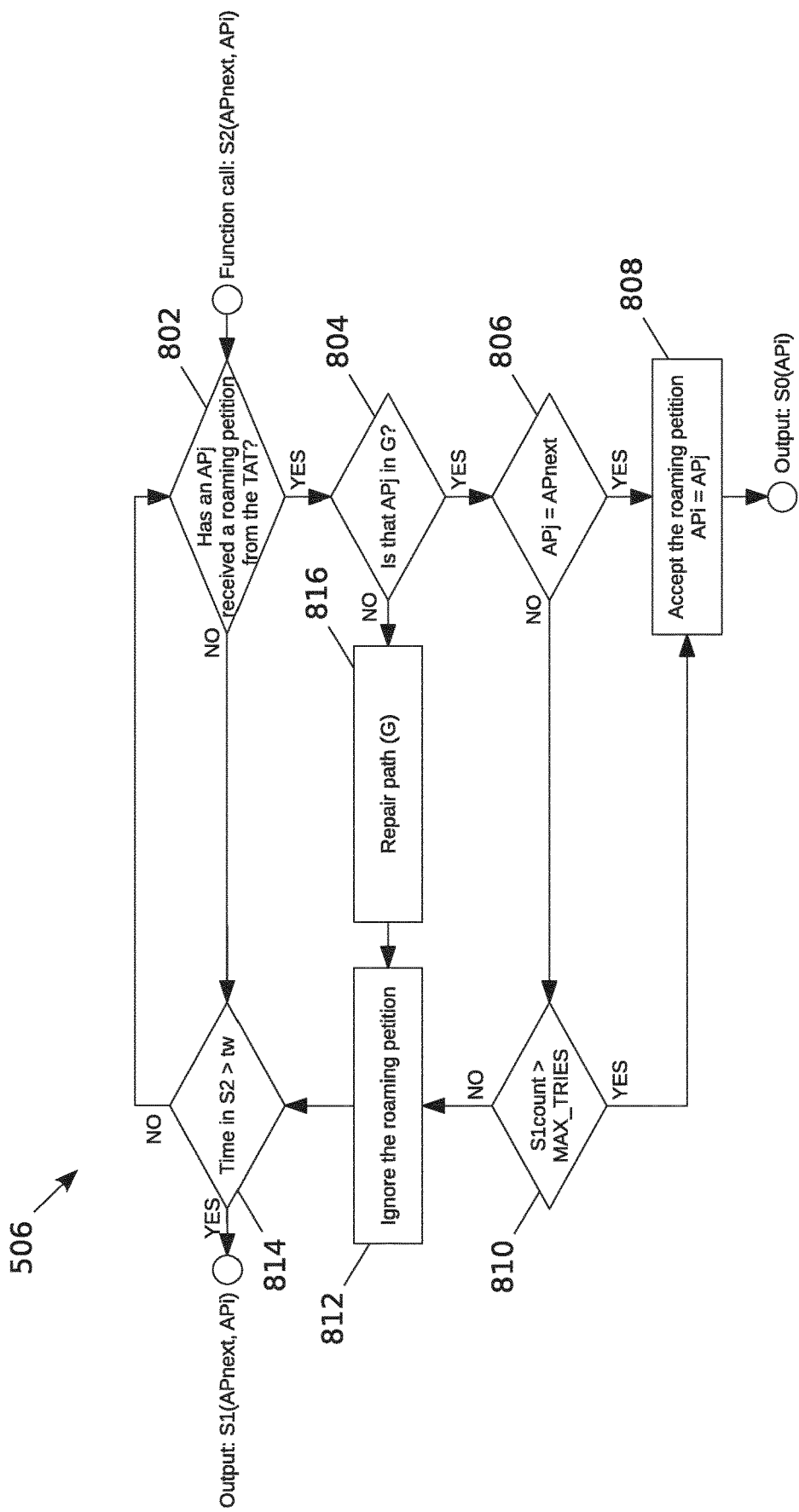

State S2 is shown in FIG. 8. When considering a centralized configuration, a central control station 122 is in charge of accepting or ignoring the roaming requests sent by the train access terminal 112. In a distributed configuration, each access point of the network performs this state S2 (in this case, the access points need to exchange some data among them). In the case that an access point $AP_j$ has received a roaming request from the train access terminal 112, which is checked in step 802, the system (i.e., the central control station 122 in a centralized configuration or each access point 102 of the network in a distributed configuration) checks 806 whether that access point $AP_j$ is the next access point ($AP_{next}$), and if so, the roaming request is accepted 808 by the next access point ($AP_{next}$). In the centralized distribution, the central control station 122 accordingly instructs the access point 102 to accept the roaming request; in a distributed structure, each access point is conveniently programmed to execute the roaming. In the case when the roaming request is received by another access point in the graph G, different from the next access point ($AP_{next}$), such request is ignored 812 unless the counter $S1_{count}$, checked in step 810, exceeds a maximum value (MAX_TRIES); otherwise, the next access point ($AP_{next}$) accepts 808 the roaming request.

The system may additionally check in step 804 whether the access point $AP_j$ receiving the roaming request is included in the graph G. If the roaming request is received by an access point that is not included in the graph G, a graph repairing operation 816 is carried out to include the new node $AP_j$ in the graph G and the roaming request is ignored 812 (the new access point needs to be accepted by the network administrator).

Once a roaming request is accepted 808, the system transitions to state S0. If the system remains in state S2 during a time higher than a permanency time $t_w$, checked in step 814, the system will immediately transition to state S1 to send a new roaming command to the train access terminal 112.

Figure 9:
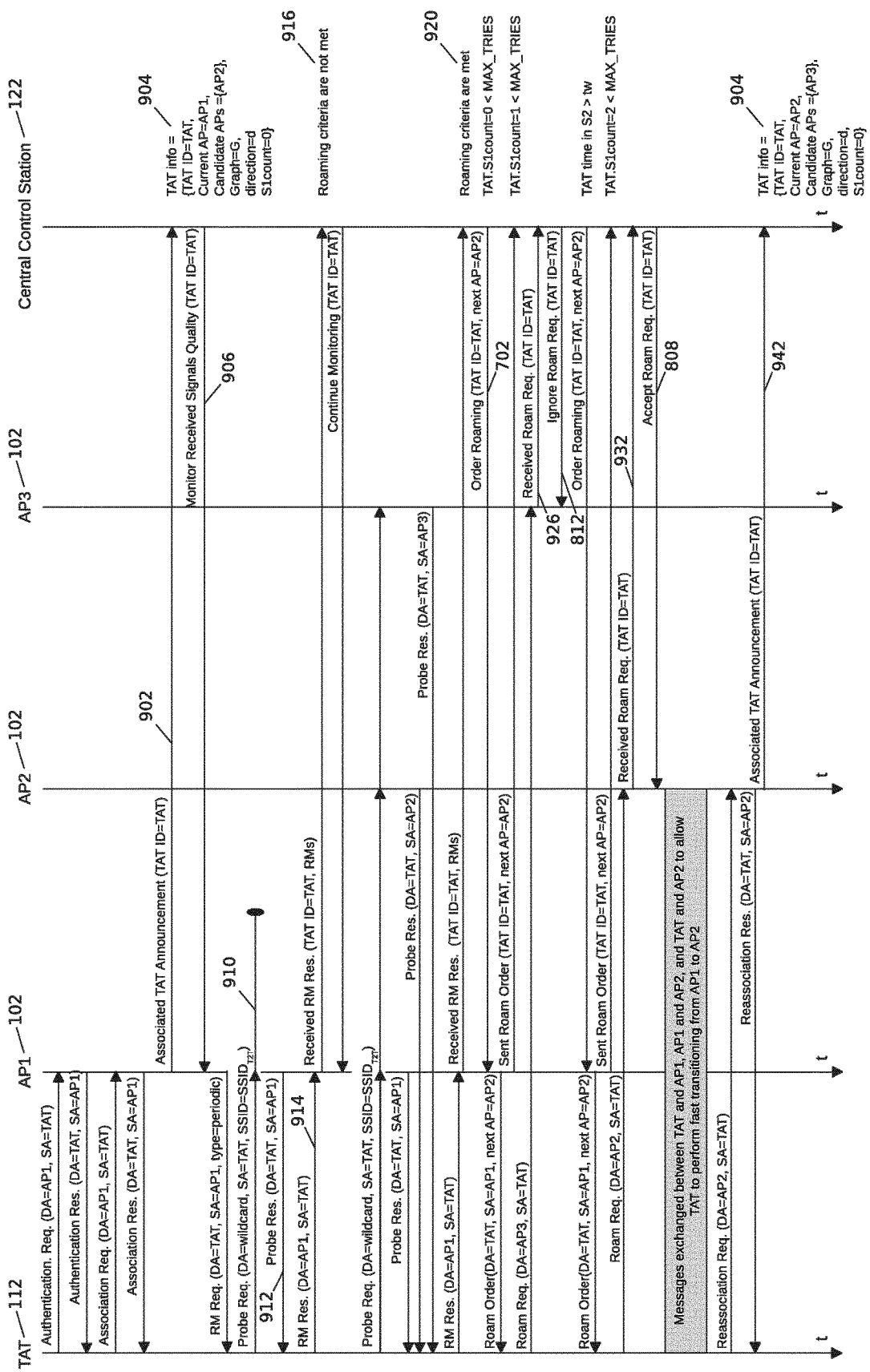
FIG. 9 shows an example of a roaming process and the messages exchanged between the system elements in a centralized configuration.

FIG. 9 depicts an example of message transfer for the state diagram of FIGS. 5 to 8 between the train access terminal 112, several access points 102 of the network (AP1, AP2, AP3) and the central control station 122 in a centralized configuration. The central control station 122 receives 902 an announcement of a train access terminal 112 newly connected to the network, detected by access point AP1 through an association request. The central control station 122 obtains the route (or a graph G corresponding to said route) and the direction of travel d of the train 110 in which the train access terminal 112 is installed (for instance by looking up a train database 124 in the central/remote data center (120, 130), which is updated by the railway operator), and updates the information 904 associated with said train access terminal 112. Knowing the access point currently associated (AP1) with the train access terminal 112, the graph G and the direction d, the central control station 122 can determine a list of candidate access points $N_i$ (in the example, the candidate is only AP2, the next access point in the route).

In this configuration, the central control station 122 instructs 906, through the access point currently associated (AP1), the train access terminal 112 to periodically scan the frequency band (e.g. by sending probe requests 910) in order to monitor 604 the quality of the signals received from all the access points 102. In the first attempt, the train access terminal 112 only receives the probe response 912 from the access point AP1, which is currently associated with the train access terminal 112, since the other access points (AP2, AP3) are out of range. The central control station 122 then computes the quality metric for each access point according to the radio measurement report within the radio measurement response 914 sent by the train access terminal. Afterwards, the central control station 122 checks compliance with the roaming criteria, but since the criteria are not met (the train access station 112 could not find a better access point) no roaming is ordered. When the train access terminal 112 finds a better candidate different from AP1, in the example AP2, and the roaming criteria are met 920, the central control station 122 commands 702 the train access terminal 112 to roam from the access point currently associated with the train access terminal 112, AP1, to the next access point, AP2. If a wrong access point, for example AP3, receives a roaming request from the train access terminal 112, the roaming request is transferred 926 to the central control station for acceptance; in this case, the central control station 122 orders the wrong access point AP3 to ignore the roaming request 812 since this access point (AP3) is not the next access point previously selected (i.e. AP2). When the correct access point, AP2, receives the roaming request from the train access terminal 112, it is remitted 932 to the central control station 122, which accepts 808 the roaming request. When the roaming process is finished and the central control station 122 is informed 942 by the new access point, AP2, the information 904 associated to the train access terminal 112 is accordingly updated (e.g. the access point currently associated with the train access terminal 112 is now AP2).

Figure 10:
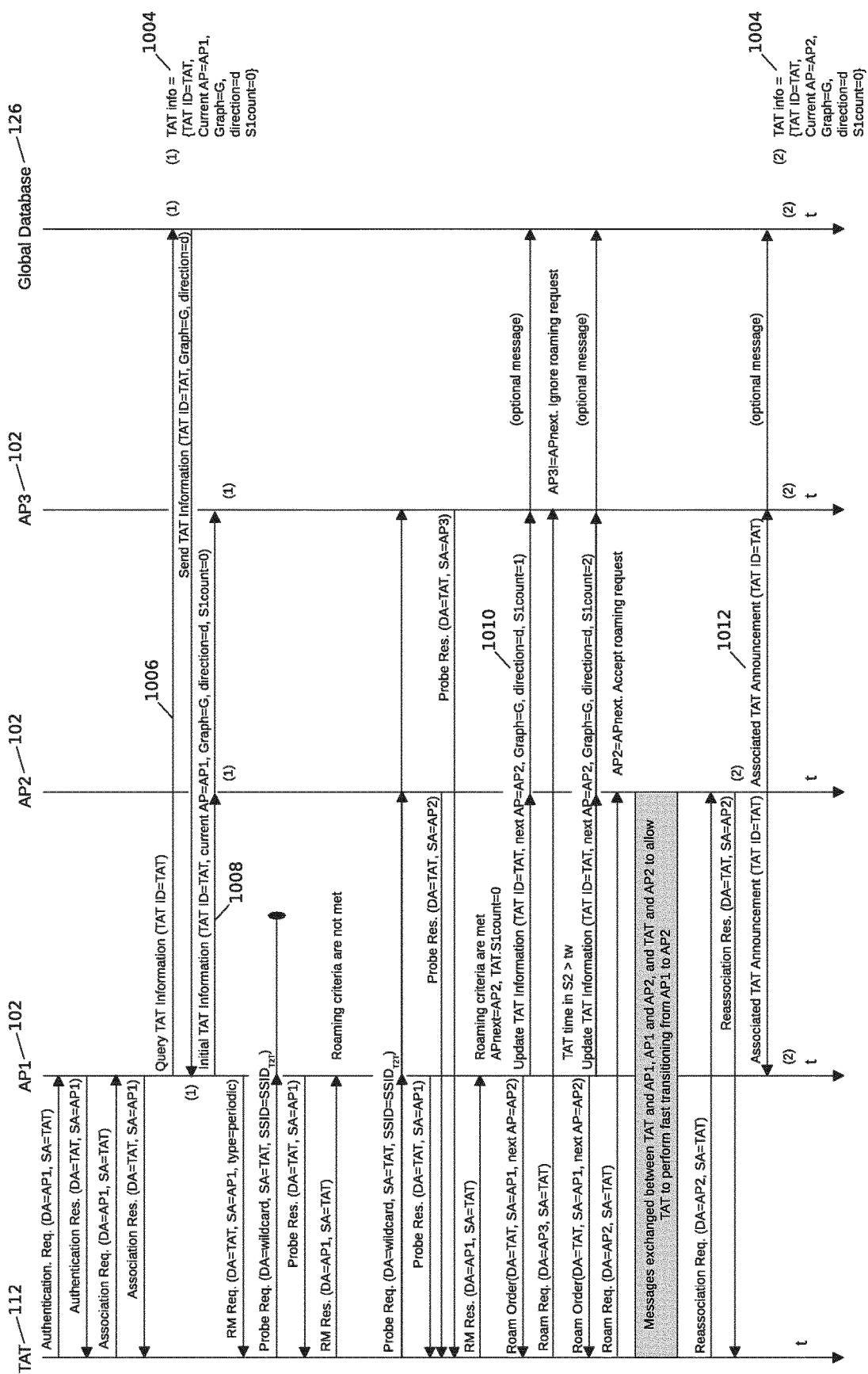
FIG. 10 shows an example of a roaming process and the messages exchanged between the system elements in a distributed configuration.

FIG. 10 shows, for a distributed configuration, an example of message transfer between the train access terminal 112, access points 102 of the network (AP1, AP2, AP3) and a global database 126 used by the access points 102 to store and share information 904 associated with the train access terminal 112. The information stored in the global database 126 may include, among other data, the access point AP$_i$ currently associated with the train access terminal 112, the graph G, the direction of travel d and the current value of the counter S1$_{count}$. In this configuration, there is no central control station 122, and the access points 102 communicate with each other by using the aggregation network. Furthermore, the access points 102 store and share information through the global database 126.

Every time a train access terminal 112 is associated with an access point 102 (AP1 in the example of FIG. 10), the access point 102 checks whether it has no updated information 1004 of that train access terminal 112. In that case, the access point 102 queries 1006 the global database 126 to get the latest information of that train access terminal 112 (i.e. the graph G and the direction d associated with the route of that train access terminal). Afterwards, the access point 102 updates its local information 1004 related to that train access terminal 112 and shares 1008 that local information 1004 with the rests of access points 102 in G (AP2 and AP3 in the example of FIG. 10). Every access point 102 updates and shares its information 1004 for every newly associated train access terminal 112. Once shared that information 1004, the access point 102 starts monitoring 604 the quality of the signals received by the train access terminal from all the access points 102. The received signals quality monitoring step may be performed as explained in the example shown in FIG. 9.

When all roaming criteria are met, the access point 102 currently associated with the train access terminal 112 commands 702 the train access terminal 112 to roam from the access point currently associated with the train access terminal 112, AP1, to the next access point, AP2. If a wrong access point 102, for example AP3, receives a roaming request from the train access terminal 112, that wrong access point will ignore the roaming request 812 since this access point (AP3) is not the next access point. When the correct access point, AP2, receives the roaming request from the train access terminal 112, that correct access point will accept 808 the roaming request. Every access 102 point in G knows which is the next access point for a train access terminal 112 because the access point currently associated with the train access terminal 112 sends an 'Update TAT Information' message 1010 to all the access points in G whenever it changes its local information 1004 for that train access terminal 112. The 'Update TAT Information' message 1010 includes which is the next access point for the train access terminal indicated in the TAT ID field. When the roaming process is finished, the access point 102 currently associated with the train access terminal 112 informs 1012 the rest of access points 102 in G that it is the new access point wherein the train access terminal is associated to.

Figure 13:
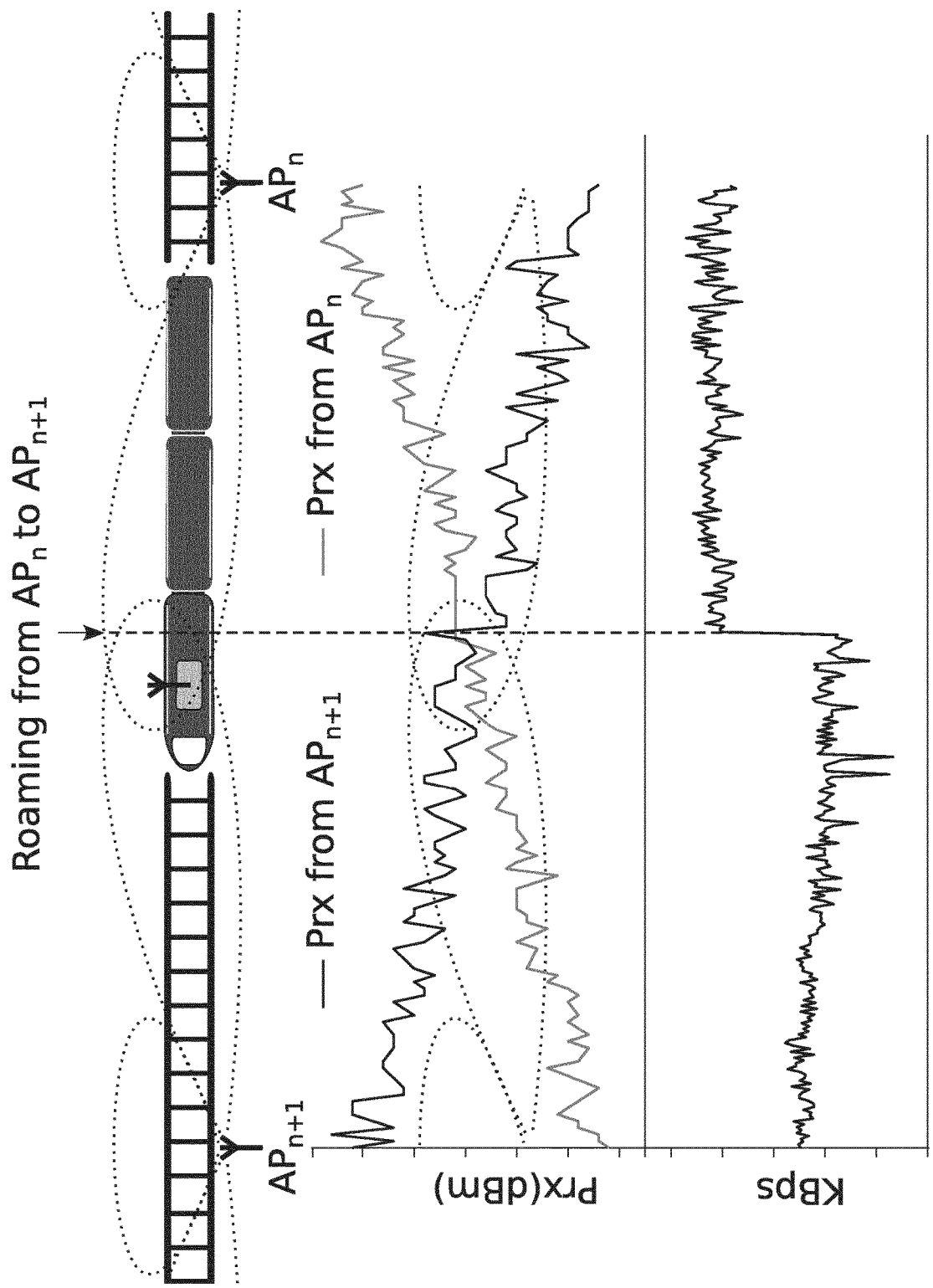
FIG. 13 represents the throughput degradation after a roaming process due to the common operation of rate control algorithms.

The invention described herein also proposes mechanisms to maintain, from one access point to another, the information used by the rate control algorithm, related to the quality of the radio link between the access point and the train access terminal, to decide which is the best modulation and coding scheme (MCS) to which data frames are transmitted. Current IEEE 802.11 networks do not consider mechanisms to exchange the rate control information, and hence, they are susceptible to be affected by the throughput degradation due to the operation of the rate control algorithm. In IEEE 802.11 networks, when a wireless device initiates a new communication with another wireless device, the rate control algorithm of each device commonly selects an initial MCS to start transmitting data. That MCS may be a randomly selected MCS, or an MCS pre-configured beforehand. Afterwards, the rate control algorithm of each wireless device changes the MCS according to the quality of the radio link between both devices. Therefore, after each roaming process, the rate control algorithm of each wireless device (i.e. train access terminal 112 and access point 102) starts transmitting with an initial MCS, normally different from the optimum MCS, and hence, train passengers perceive a degradation in their quality of service. An example of this degradation is shown in FIG. 13.

Prior-art rate control algorithms may use different metrics to select the MCS at which data frames are transmitted. For example, some rate control algorithms use the signal-to-noise-plus-interference ratio (SNIR). However, the most common practice is to use the MCS that provides the higher chance of satisfactory frame reception (e.g. the Minstrel rate control algorithm). In order to do so, the rate control algorithm maintains a local database where it stores the probability of satisfactory frame reception for each possible MCS. This local database is herein referred to as RCDL$_i$ for the downlink communication between the access point 102 and the train access terminal 112 and RCUL for the uplink communication between the access point 102 and the train access terminal 112. In IEEE 802.11 networks in infrastructure mode, a train access terminal 112 can only communicate with the access point to which is currently associated, and hence, its rate control algorithm only needs to maintain a local database for that access point (i.e. RCUL). Furthermore, when a train access terminal 112 stops being associated with an access point, the rate control algorithms of both wireless devices may delete the local databases associated with that communication.

Figure 14:
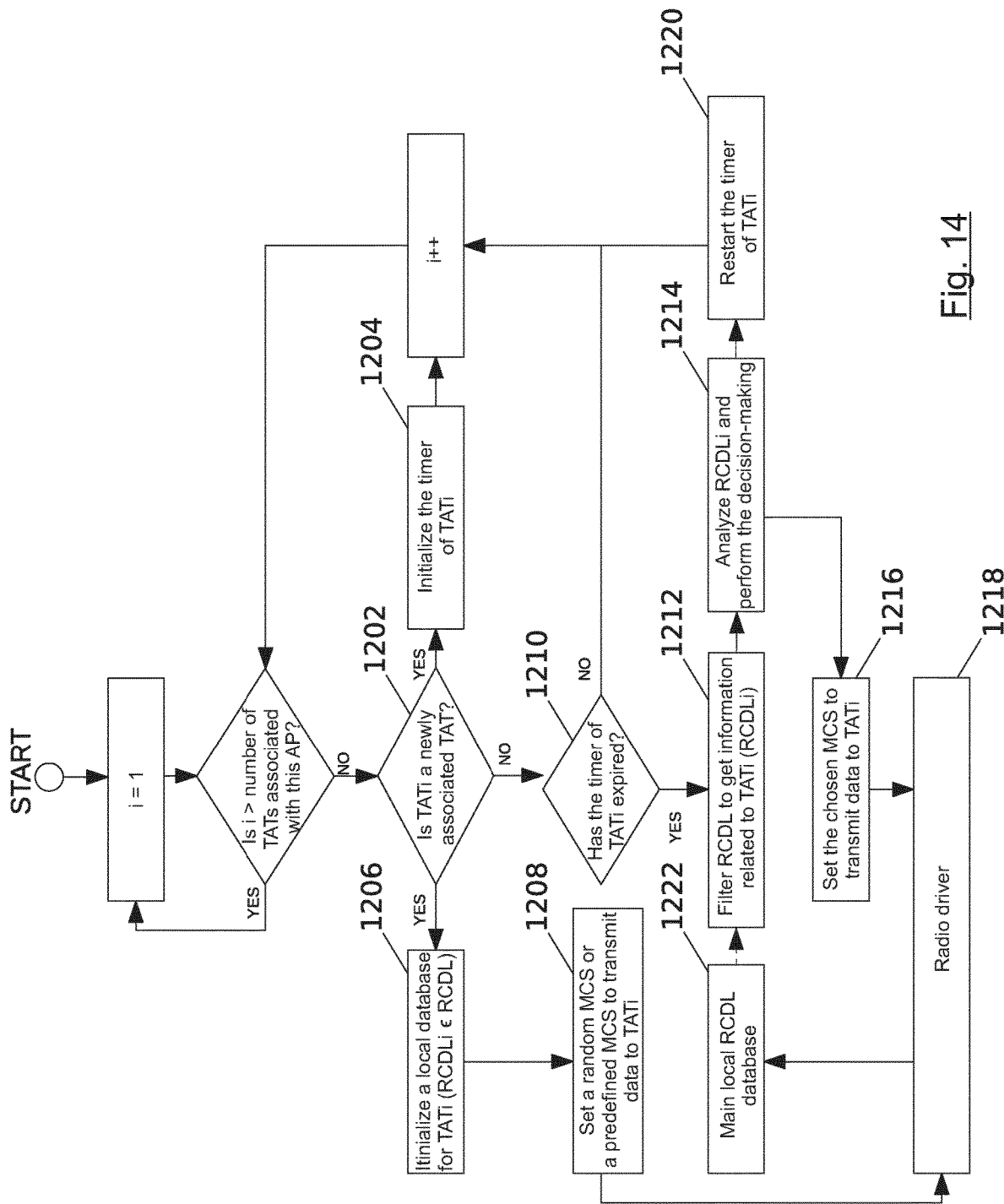
FIG. 14 illustrates an example of the common operation, according to the prior art, of a rate control algorithm in the downlink (access point side).
Figure 15:
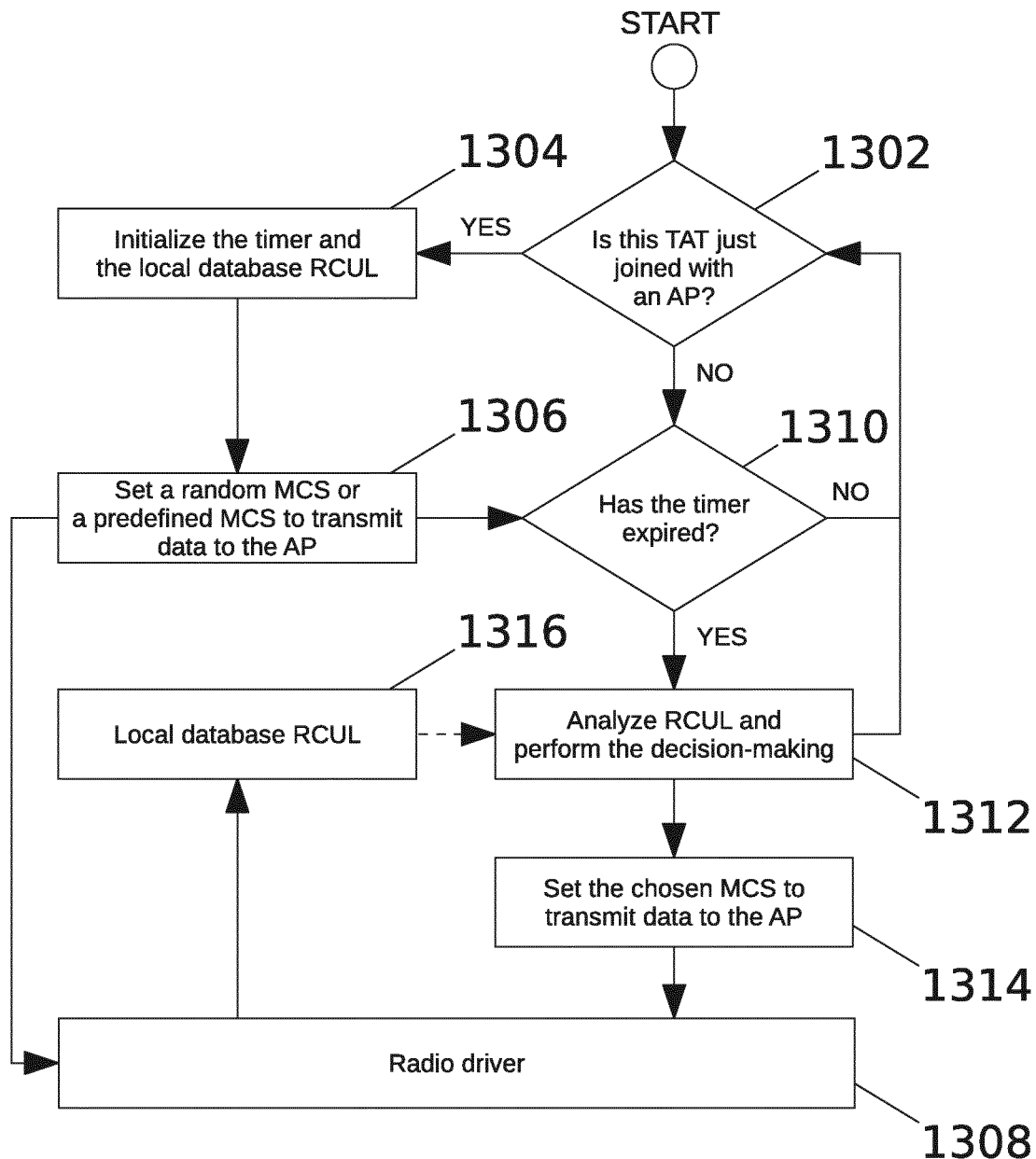
FIG. 15 illustrates an example of the common operation, according to the prior art, of a rate control algorithm in the uplink (train access terminal side).

A flow diagram showing the common operation of a rate-control algorithm of the prior art is depicted in FIG. 14 for the downlink communication between an access point 102 and its associated train access terminals 112, and in FIG. 15 for the uplink communication between a train access terminal 112 and an access point 102. As can be observed in FIG. 14, the rate control algorithm of the access point 102 firstly checks 1202 whether there is a newly associated train access terminal 112, and in that case, a new local database and a timer are initialized (1204, 1206) for that train access terminal 112. Furthermore, an initial MCS is configured 1208 to transmit data to that train access terminal 112.

Otherwise, the rate control algorithm checks 1210 whether the timer associated with each of the train access terminal 112 has expired. Upon detecting that a timer has expired, the rate control algorithm analyzes 1212 its local database for the train access terminal $TAT_i$ associated with that timer (i.e. $RCDL_i$) in order to determine 1214 which is the new MCS used to transmit data to that train access terminal $TAT_i$. Finally, that MCS is configured 1216 in the radio driver 1218 and the timer for that train access terminal TATi is restarted 1220. The radio driver 1218 may accept a different configuration for each train access terminal 112. Furthermore, it is important to note that the information stored in the local database (RCDL) is updated 1222 as the radio driver 1218 sends data frames to each train access terminal $TAT_i$. The process is performed for every train access terminal i currently associated with the access point.

On the other hand, as can be observed in FIG. 15 depicting the operation of a prior-art rate-control algorithm for the uplink communication between a train access terminal 112 and an access point 102, the rate control algorithm of the train access terminal 112 firstly checks 1302 whether the train access terminal 112 has just associated itself with an access point 102, and in that case, it initializes 1304 its timer and its local database (RCUL). Furthermore, it sets 1306 an initial MCS in the radio driver 1308. Otherwise, the rate control algorithm checks 1310 whether its timer has expired. If this last happens, the rate control algorithm analyzes 1312 its local database (RCUL) to determine which is the new MCS with which the radio driver must transmit data to the access point. Finally, it sets 1314 the chosen MCS in the radio driver 1308. The information stored in the local database (RCUL) is updated 1316 as the radio driver 1308 sends data to the access point.

Figure 16:
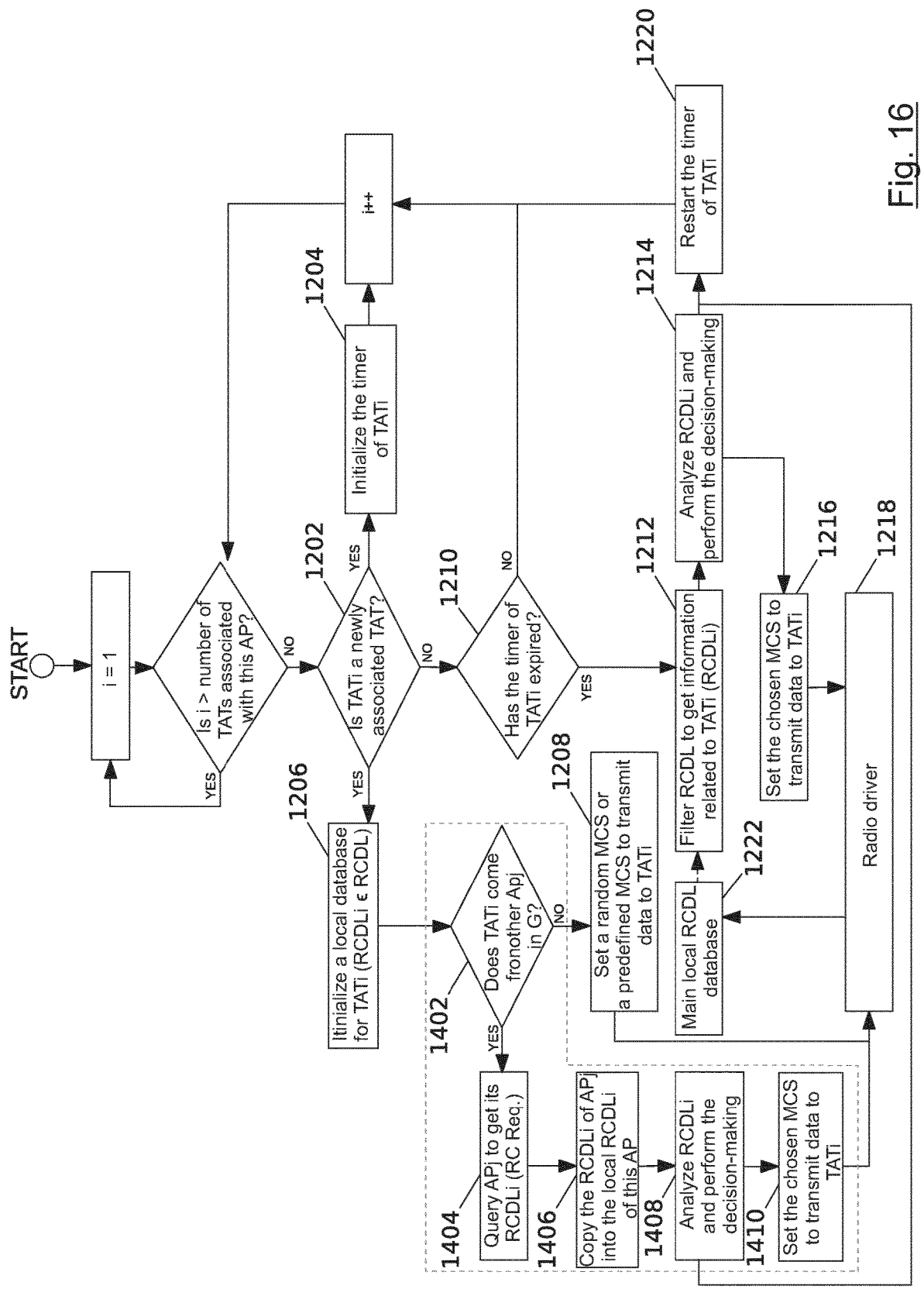
FIG. 16 shows an example of the operation of a rate control algorithm in the downlink (access point side) according to an embodiment of the present invention.
Figure 18:
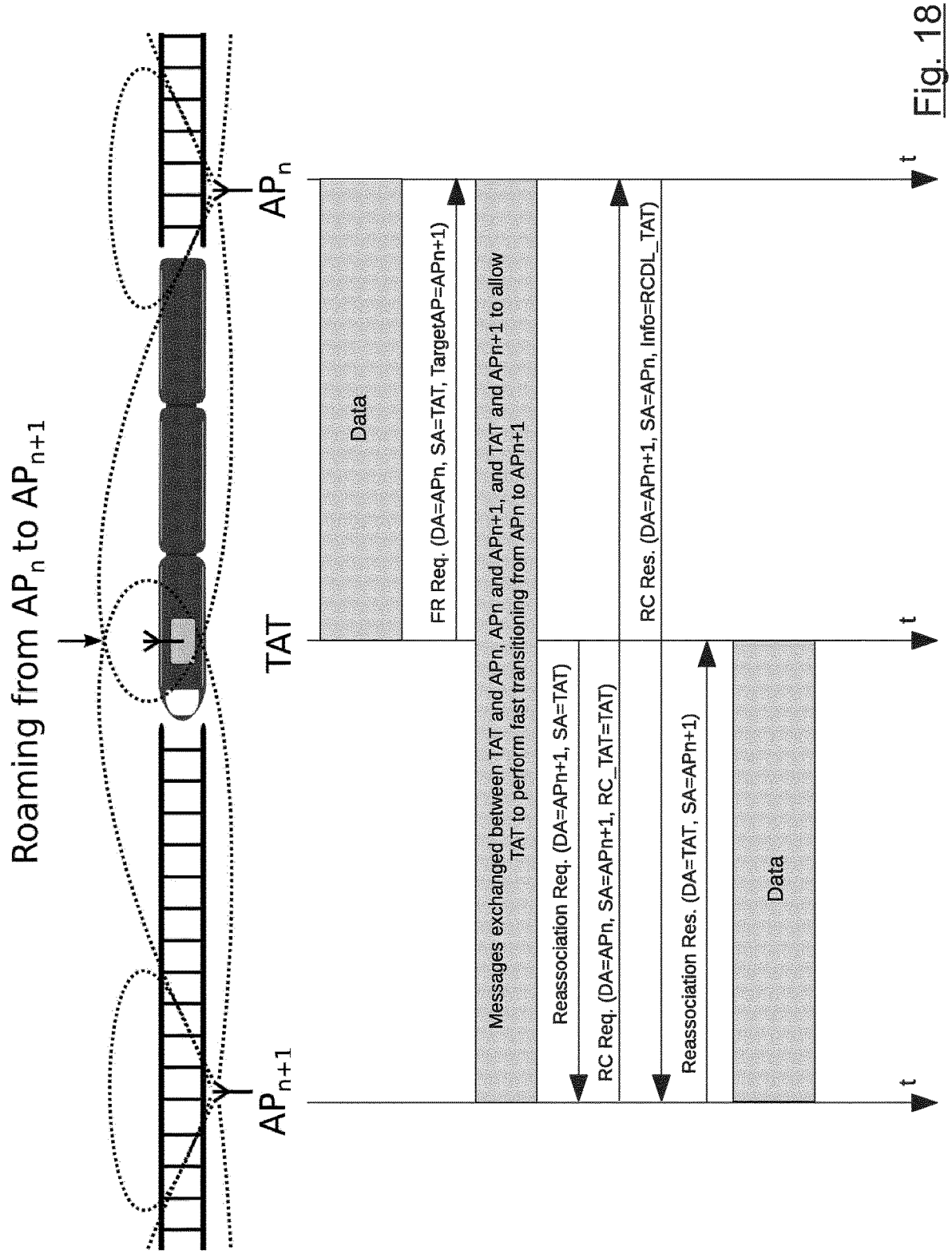
FIG. 18 represents an example of communication of messages to transfer the local database RCDL of a train access terminal from one access point to another.
Figure 19:
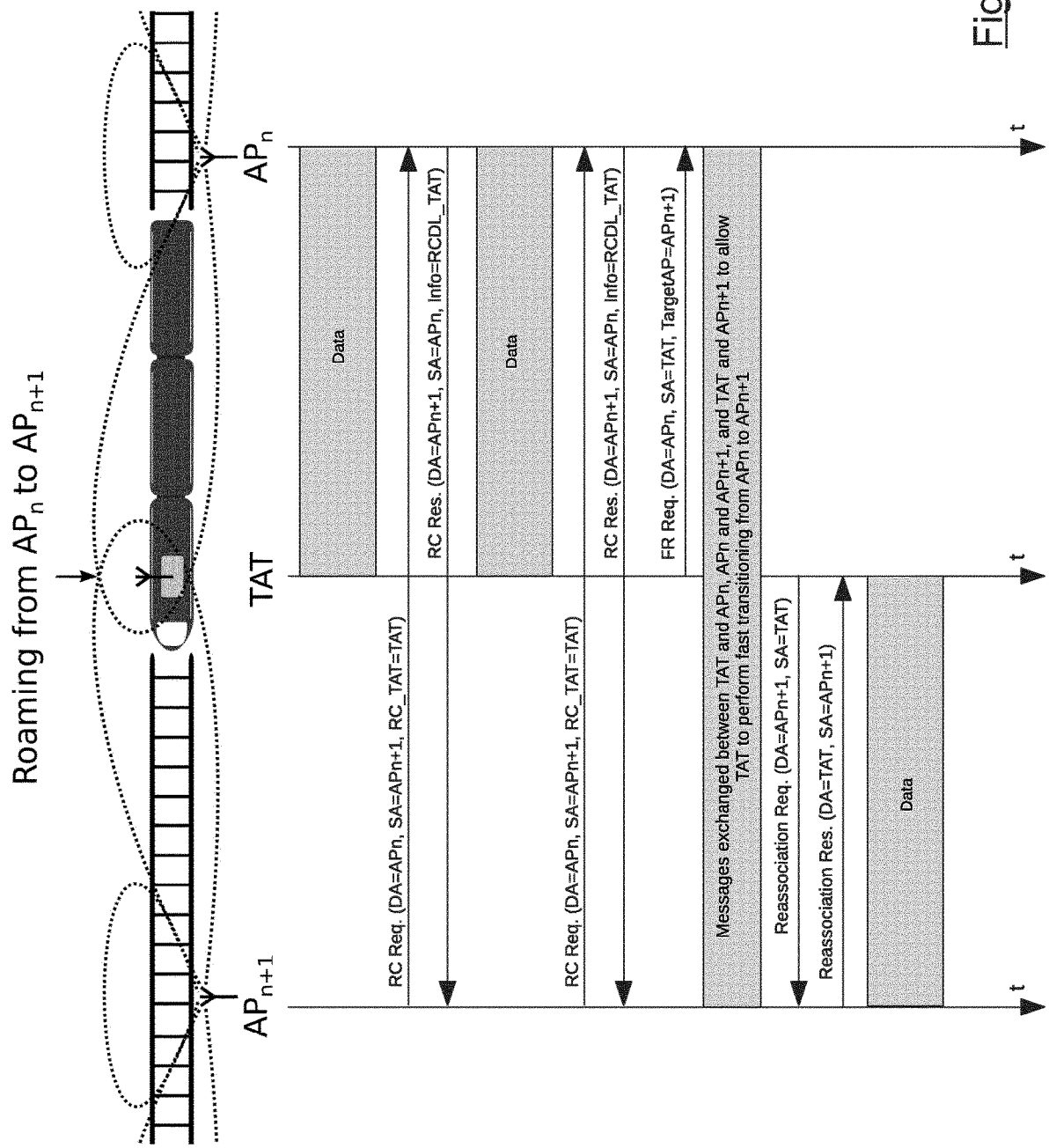
FIG. 19 shows an example of communication of messages to periodically transfer the local database RCDL of a train access terminal from one access point to another.
Figure 20:
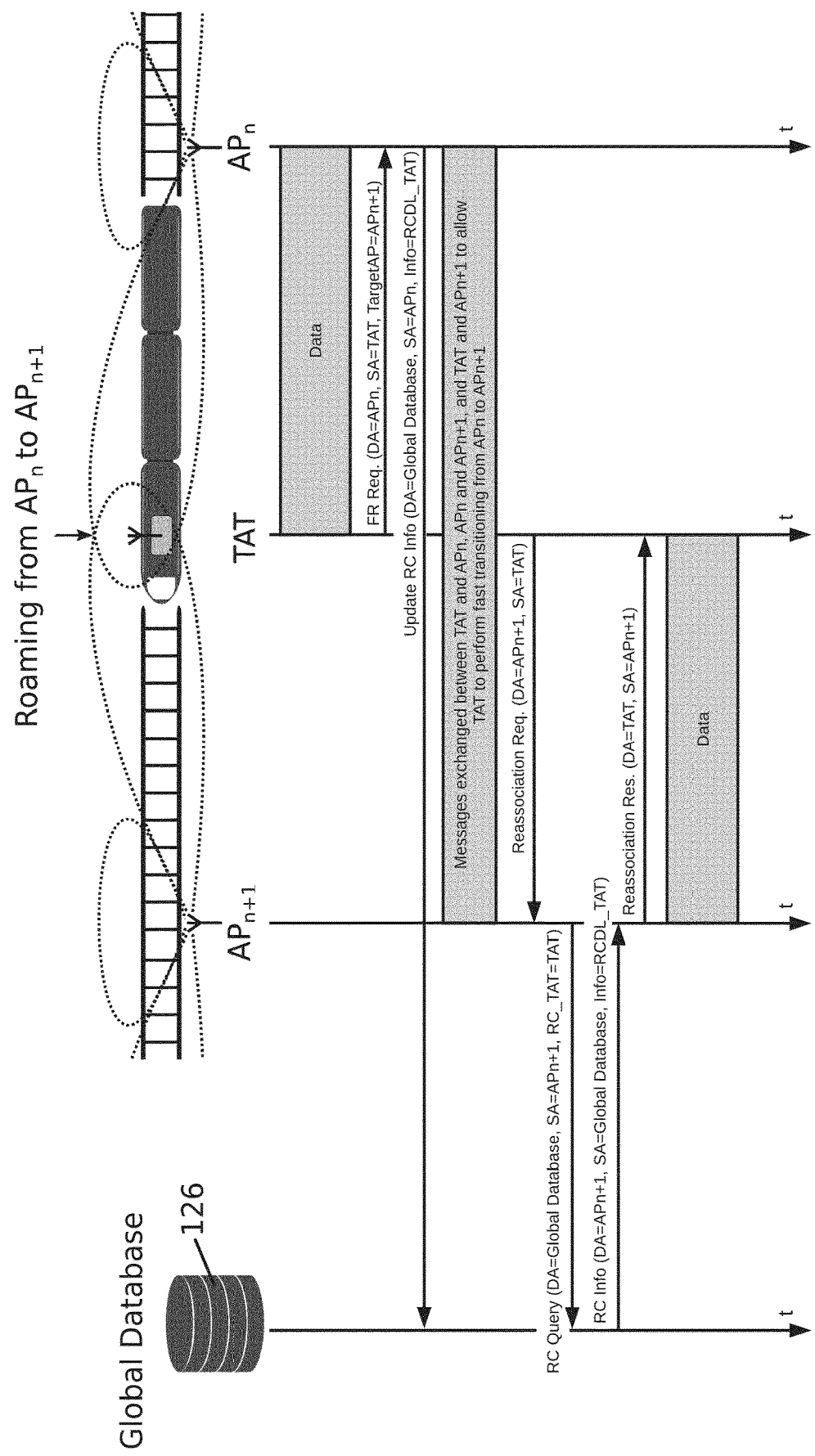
FIG. 20 depicts an example of communication of messages to update and query the local database RCDL of a train access terminal using a global database.

As can be observed in FIG. 14 and FIG. 15, prior-art rate control algorithms neither provide mechanisms to exchange the local databases ($RCDL_i$) between access points, nor mechanisms to maintain the local database RCUL when the train access terminal 112 roams from one access point to another. The invention described herein proposes mechanisms to exchange and maintain such databases in order to avoid the throughput degradation that normally occur just after a roaming process is finished (see FIG. 13). FIG. 16 shows the flow diagram, according to an embodiment of the present invention, for the rate control algorithm associated with the downlink communication between the access point and its associated train access terminals. The steps inside the dotted contour are new when compared to the prior-art method of FIG. 14. When the rate control algorithm detects, in step 1202, that there is a newly associated train access terminal ($TAT_i$), it initializes (1204, 1206) the local database and the timer for that train access terminal $TAT_i$ (i.e. $RCDL_i$). Afterwards, it queries 1402 if that train access terminal $TAT_i$ comes from another access point $AP_j$ in the graph G. If the train access terminal 112 does not come from another access point in the graph G, the rate control algorithm continues with its common operation, as previously discussed in FIG. 14. Otherwise, the rate control algorithm sends a rate control request (RC request, with a field TAT ID including the queried train access terminal, which is the train access terminal that is going to perform roaming) 1404 to the rate control algorithm of that access point $AP_j$ to obtain the local database for that train access terminal $TAT_i$ ($RCDL_i$ in $AP_j$). Upon receiving an RC request, the corresponding rate control algorithm responds with an RC response including the queried local database $RCDL_i$. Once the rate control algorithm receives an RC response, it copies 1406 the received database (i.e. $RCDL_i$ of $AP_j$) into its local database (i.e. its $RCDL_i$). Then, the rate control algorithm analyzes 1408 the local database $RCDL_i$ to determine which would be the best MCS to transmit data frames to that train access terminal $TAT_i$. Finally, the rate control algorithm sets 1410 the selected MCS for that train access terminal $TAT_i$ in the radio driver 1218 and continues its common operation, as previously discussed in FIG. 14. It is important to take into account that RC requests can be sent at any time chosen by the rate control algorithm. For example, the rate control algorithm can be configured to transmit RC requests (RC Req.) just after its access point receives the reassociation request that is sent during a fast roaming process. Furthermore, the access point may transmit the reassociation response just after receiving the RC response in order to assure that the local database $RCDL_i$ for that train access terminal $TAT_i$ is analyzed before transmitting data frames to that train access terminal $TAT_i$, as it is shown in the example of FIG. 18. In other embodiment, the rate control algorithm of each of the next access points in the graph G periodically sends RC requests to the access point where the train access terminal 112 is currently associated, see FIG. 19. This way, the time needed to reassociate a train access terminal $TAT_i$ during a fast roaming (FR) process (which starts with a "FR Req." message) may be reduced because each of the next access points in the graph G already has an updated $RCDL_i$. Other realizations may include a global database 126 where the access points update and query the database associated with every train access terminal 112. FIG. 20 shows an example where a global database 126 is used in the example shown in FIG. 18.

Figure 17:
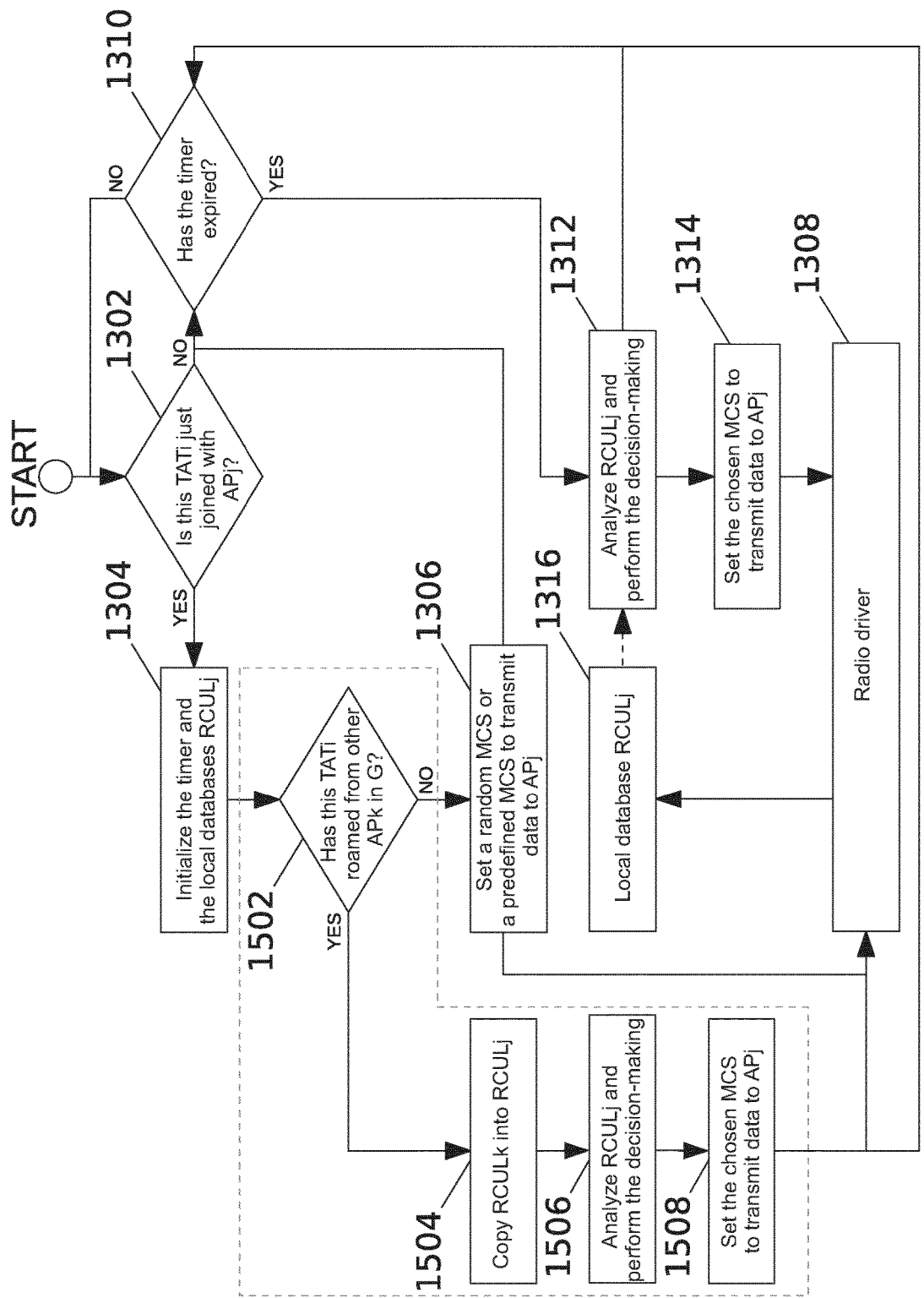
FIG. 17 shows an example of the operation of a rate control algorithm in the uplink (train access terminal side) according to an embodiment of the present invention.

FIG. 17 shows the flow diagram of a preferred embodiment for the rate control algorithm associated with the uplink communication between the train access terminal 112 and the access point to which is associated. The steps inside the dotted contour are new when compared to the prior-art method of FIG. 15. When the rate control algorithm detects 1302 that its train access terminal 112 has just associated itself with an access point $AP_j$, it initializes 1304 its timer and its local database (RCUL) and, afterwards, it queries 1502 whether its train access terminal 112 has roamed between two access points in the graph G (in this flow diagram, $AP_n=AP_k$ and $AP_{n+1}=AP_j$). If the train access terminal 112 has not roamed between two access points in the graph G, the rate control algorithm continues with its common operation, as explained in FIG. 15. Otherwise, the rate control algorithm copies 1504 the local database associated with access point $AP_k$ (i.e. $RCUL_k$) in the local database recently initialized for access point $AP_j$ (i.e. $RCUL_j$). Then, it proceeds to analyze 1506 this local database $RCUL_j$ to determine which would be the best MCS to transmit data frames to access point $AP_j$. Finally, the rate control algorithm sets 1508 the selected MCS in the radio driver 1308 and continues the common operation described in FIG. 15. Once the rate control algorithm has copied $RCUL_k$ into $RCUL_j$, it may delete or temporarily maintain that $RCUL_k$.

FIG. 21 shows an example of a table containing information $RCDL_i$ and $RCUL_j$ related to the quality of the radio links between the train access terminal $TAT_i$ and the access point associated with the train access terminal. This information is used by rate control algorithms in IEEE802.11 networks, such as the Minstrel rate control algorithm, to determine the best modulation and coding scheme (MCS). There are other known rate control algorithms, each of them using different type of gathered information to determine the MCS.

The invention claimed is:

1. A method of handling roaming in a train-to-trackside wireless network, the network comprising a plurality of access points deployed along a railway track and one or more train access terminals installed on-board at least one train, the method comprising:
   receiving, by an access point ($AP_i$) currently associated with a train access terminal installed on-board a train, radio measurements of signals received by the train access terminal from access points of the train-to-trackside wireless network;
   determining a list of candidate access points for the train access terminal, based on a direction of travel and a route followed by the train;
   determining, based on the received radio measurements, a next access point ($AP_{next}$), said next access point ($AP_{next}$) being the access point providing the highest signal quality (maxSQ) according to a quality metric;
   evaluating compliance with a set of roaming criteria, the roaming criteria including:
      the next access point ($AP_{next}$) is included in the list of candidate access points ($N_i$);
      an amount of time elapsed since the last roaming performed by the train access terminal exceeds a minimum permanency time ($t_p$);
      the highest signal quality (maxSQ) exceeds the signal quality (SQ(i)) of the access point ($AP_i$) currently associated with the train access terminal by at least a roaming margin;
   if the roaming criteria are met, sending, by the access point ($AP_i$) currently associated with the train access terminal, a roaming command instructing the train access terminal to roam from the access point ($AP_i$) currently associated with the train access terminal to the next access point ($AP_{next}$).

2. The method of claim 1, further comprising acquiring the direction of travel (d) and the route followed by the train by accessing a train database of a data center.

3. The method of claim 1, wherein all the access points deployed along the railway track share a common SSID, and wherein the method comprises sending, by the access point ($AP_i$) currently associated with the train access terminal, a radio measurement request addressed to the train access terminal and including a command to perform active scanning of the common SSID.

4. The method of claim 1, the method comprising repeatedly sending, by the train access terminal, radio measurements of signals received from access points in range of the train access terminal, to the access point currently associated with the train access terminal.

5. The method of claim 1, wherein the quality metric includes computing, for each access point, a least squares regression of the instant values of the signals strength comprised in the radio measurements received from the train access terminal.

6. The method of claim 1, wherein the roaming margin is a dynamic margin M(t) that decreases over time for $t > t_r$, where $t_r$ is the instant of time when the last roaming procedure of the train access terminal occurred.

7. The method of claim 1, further comprising:
   obtaining, by the next access point ($AP_{next}$) when the roaming criteria are met, information ($RCDL_i$) related to the quality of the radio link between the train access terminal and the access point ($AP_i$) currently associated with the train access terminal;
   determining, based on said information ($RCDL_i$), a modulation and coding scheme to transmit data frames from the next access point ($AP_{next}$) to the train access terminal;
   setting, in a radio driver of the next access point ($AP_{next}$), the selected modulation and coding scheme for a downlink communication with the train access terminal.

8. The method of claim 7, wherein the information ($RCDL_i$) used to determine the modulation and coding scheme is obtained by querying the access point ($AP_i$) currently associated with the train access terminal.

9. The method of claim 7, further comprising storing, on a global database by each access point of the train-to-trackside wireless network, information related to the quality of the radio link between the access point and the associated train access terminals; and wherein the information ($RCDL_i$) used to determine the modulation and coding scheme is retrieved by the next access point ($AP_{next}$) by accessing the global database when the roaming criteria are met.

10. The method of claim 1, further comprising:
    receiving, by an access point ($AP_j$) of the network, a roaming request from a train access terminal;
    checking if said access point ($AP_j$) corresponds to the determined next access point ($AP_{next}$), and in that case accepting the roaming request by the next access point ($AP_{next}$); otherwise, ignoring the roaming request.

11. A system for handling roaming in a train-to-trackside wireless network, the system comprising a plurality of access points deployed along a railway track, the access points including an access point currently associated with a train access terminal installed on-board a train, the system being configured to:
    receive, by the access point ($AP_i$) currently associated with the train access terminal, radio measurements of signals received by the train access terminal from access points of a train-to-trackside wireless network;
    determine a list of candidate access points for the train access terminal, based on a direction of travel and a route followed by the train;
    determine, based on the received radio measurements, a next access point ($AP_{next}$), said next access point ($AP_{next}$) being the access point providing the highest signal quality (maxSQ) according to a quality metric;
    evaluate compliance with a set of roaming criteria, the roaming criteria including:
       the next access point ($AP_{next}$) is included in the list of candidate access points ($N_i$);
       an amount of time elapsed since the last roaming performed by the train access terminal exceeds a minimum permanency time ($t_p$);
       the highest signal quality (maxSQ) exceeds the signal quality (SQ(i)) of the access point ($AP_i$) currently associated with the train access terminal by at least a roaming margin;
    if the roaming criteria are met, send, by the access point ($AP_i$) currently associated with the train access terminal, a roaming command instructing the train access terminal to roam from the access point ($AP_i$) currently associated with the train access terminal to the next access point ($AP_{next}$).

12. The system of claim 11, comprising a central control station configured to receive the radio measurements from the access point, determine the list of candidate access points, determine the next access point and evaluate compliance with the roaming criteria.

13. The system of claim 12, wherein the central control station is configured to, upon reception, by an access point ($AP_i$) of the network, of a roaming request from a train access terminal, check if said access point ($AP_j$) corresponds to the determined next access point ($AP_{next}$), and in that case accept the roaming request by the next access point ($AP_{next}$); otherwise, ignoring the roaming request.

14. The system of claim 11, wherein the access point ($AP_i$) currently associated with the train access terminal is configured to determine the list of candidate access points, determine the next access point and evaluate compliance with the roaming criteria.

15. The system of claim 14, wherein each access point ($AP_j$) is configured to, upon reception of a roaming request from a train access terminal, check if said access point ($AP_j$) corresponds to the next access point ($AP_{next}$) determined by the access point ($AP_i$) currently associated with a train access terminal, and in that case accept the roaming request; otherwise, ignore the roaming request.

* * * * *